United States Patent
Watanabe

(10) Patent No.: US 12,557,411 B2
(45) Date of Patent: Feb. 17, 2026

(54) SOLID-STATE IMAGING DEVICE AND ELECTRONIC APPARATUS

(71) Applicant: SONY SEMICONDUCTOR SOLUTIONS CORPORATION, Kanagawa (JP)

(72) Inventor: Tsuyoshi Watanabe, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 612 days.

(21) Appl. No.: 17/998,987

(22) PCT Filed: Apr. 15, 2021

(86) PCT No.: PCT/JP2021/015528
§ 371 (c)(1),
(2) Date: Nov. 16, 2022

(87) PCT Pub. No.: WO2021/241053
PCT Pub. Date: Dec. 2, 2021

(65) Prior Publication Data
US 2023/0215886 A1    Jul. 6, 2023

(30) Foreign Application Priority Data

May 28, 2020   (JP) ................................. 2020-092847

(51) Int. Cl.
*H10F 39/00*   (2025.01)

(52) U.S. Cl.
CPC .......... *H10F 39/804* (2025.01); *H10F 39/80* (2025.01); *H01L 2224/48091* (2013.01)

(58) Field of Classification Search
CPC ....... H10F 39/80; H10F 39/802; H10F 39/804
See application file for complete search history.

(56) References Cited

U.S. PATENT DOCUMENTS

| | | | |
|---|---|---|---|
| 2003/0122137 A1* | 7/2003 | Hashimoto | H10F 39/804 257/E33.059 |
| 2004/0214369 A1* | 10/2004 | Minamio | H10F 39/80 438/106 |

(Continued)

FOREIGN PATENT DOCUMENTS

| | | |
|---|---|---|
| JP | H05-284396 | 10/1993 |
| JP | H06151796 A * | 5/1994 |

(Continued)

OTHER PUBLICATIONS

International Search Report and Written Opinion prepared by the Japan Patent Office on Jun. 25, 2021, for International Application No. PCT/JP2021/015528, 2 pgs.

*Primary Examiner* — Matthew E Warren
(74) *Attorney, Agent, or Firm* — SHERIDAN ROSS P.C.

(57) ABSTRACT

To cope with heat generation of a solid-state imaging element, a package size is reduced with a simple structure, and a transmission delay of a high-speed interface is suppressed. A solid-state imaging device includes: a solid-state imaging element in which one plate surface side of a semiconductor substrate is a light receiving side; a substrate on which the solid-state imaging element is mounted on a front surface that is one plate surface; a support member provided on the front surface side of the substrate so as to surround the solid-state imaging element; and a plurality of connectors provided on a back surface that is another plate surface of the substrate and positioned outside an arrangement region of the solid-state imaging element on the substrate, in which at least a part of the connector is positioned outside an arrangement region of the support member on the substrate.

20 Claims, 17 Drawing Sheets

(56) References Cited

U.S. PATENT DOCUMENTS

| | | | | |
|---|---|---|---|---|
| 2005/0163016 A1* | 7/2005 | Kimura | .................. | H04N 23/54 |
| | | | | 369/112.01 |
| 2007/0181792 A1* | 8/2007 | Yoshimoto | ............ | H10F 39/804 |
| | | | | 250/239 |
| 2017/0309756 A1 | 10/2017 | Hokari | | |

FOREIGN PATENT DOCUMENTS

| | | | | |
|---|---|---|---|---|
| JP | H10-144898 | | 5/1998 | |
| JP | 2001-177023 | | 6/2001 | |
| JP | 2008-172090 | | 7/2008 | |
| JP | 2009-070876 | | 4/2009 | |
| JP | 2012-044381 | | 3/2012 | |
| JP | 2022114386 A * | 8/2022 | ............ | H04N 25/70 |
| WO | WO-2019235249 A1 | 12/2019 | | |

* cited by examiner

SOLID-STATE IMAGING DEVICE AND ELECTRONIC APPARATUS

CROSS REFERENCE TO RELATED APPLICATIONS

This application is a national stage application under 35 U.S.C. 371 and claims the benefit of PCT Application No. PCT/JP2021/015528, having an international filing date of 15 Apr. 2021, which designated the United States, which PCT application claimed the benefit of Japanese Patent Application No. 2020-092847, filed 28 May 2020, the entire disclosures of each of which are incorporated herein by reference.

TECHNICAL FIELD

The present technology relates to a solid-state imaging device and an electronic apparatus.

BACKGROUND ART

Conventionally, as a solid-state imaging device having an image sensor as a solid-state imaging element, there is a solid-state imaging device having the following package structure. That is, the package structure is a package structure in which an image sensor is mounted on a substrate formed of a material such as an organic material or ceramics, and a translucent member such as glass is provided on the light receiving surface side of the image sensor so as to form a hollow portion together with a predetermined support member. The image sensor is a chip in which a plurality of light receiving elements constituting a pixel is formed on one plate surface side of a semiconductor substrate such as silicon (Si), and is mounted on the substrate directly with an adhesive or indirectly via an interposed member such as a metal plate.

In such a solid-state imaging device, heat generation increases as the number of pixels of an image sensor increases and the frame rate increases. On the other hand, it is difficult to increase a package size for heat dissipation or to provide a cooling mechanism in order to cope with heat generation due to a high need for miniaturization and weight reduction of the device.

In order to cope with such a problem, Patent Document 1 discloses a configuration in which an image sensor is mounted on a housing as a support member that supports glass, an electrode terminal such as a lead or a pin is extended on a back side of the housing to secure a space between the housing and a substrate, and a metal plate is interposed in the space. In such a configuration, a method is adopted in which a metal plate is brought into contact with a lens housing covering a package structure, and heat is dissipated by providing a heat conduction member in a housing or the like.

However, according to the configuration in which an electrode terminal such as a pin is extended on the back side of the housing and the metal plate is interposed between the housing and the substrate as disclosed in Patent Document 1, in the case of a multi-pin image sensor compatible with a high-speed interface, it is difficult to narrow the interval between the electrode terminals such as pins, and the package size increases. In addition, when the package size increases, the wiring length increases due to the influence, and there is a problem that a transmission delay of a high-speed interface occurs.

In order to cope with such a problem, it is conceivable to use a configuration as disclosed in Patent Document 2. That is, an image sensor held by the holding metal fitting is mounted on a substrate having a connector and having a through hole formed therein, and the heat dissipation metal fitting is brought into contact with the image sensor from the through hole of the substrate through the holding metal fitting.

CITATION LIST

Patent Document

Patent Document 1: Japanese Patent Application Laid-Open No. 2001-177023
Patent Document 2: Japanese Patent Application Laid-Open No. 2012-44381

SUMMARY OF THE INVENTION

Problems to be Solved by the Invention

Indeed, as disclosed in Patent Document 2, according to the configuration in which the heat dissipation metal fitting is brought into contact with the image sensor by penetrating the holding metal fitting or the substrate of the image sensor, it is considered that the heat dissipation of the image sensor can be performed while suppressing the package size. However, according to the configuration disclosed in Patent Document 2, there is a problem that the shape of each component becomes complicated, the number of components increases, and time and effort required for mounting the components increase.

An object of the present technology is to provide a solid-state imaging device and an electronic apparatus capable of reducing a package size with a simple structure and suppressing a transmission delay of a high-speed interface in coping with the heat generation of a solid-state imaging element.

Solutions to Problems

A solid-state imaging device according to the present technology includes: a solid-state imaging element in which one plate surface side of a semiconductor substrate is a light receiving side; a substrate on which the solid-state imaging element is mounted on a front surface that is one plate surface; a support member provided on the front surface side of the substrate so as to surround the solid-state imaging element; and a plurality of connectors provided on a back surface that is another plate surface of the substrate and positioned outside an arrangement region of the solid-state imaging element on the substrate, in which at least a part of the connector is positioned outside an arrangement region of the support member on the substrate.

According to another aspect of the solid-state imaging device according to the present technology, in the solid-state imaging device, the substrate includes a pressed portion that receives a load for fitting the connector to a fitted portion of the connector, outside an arrangement region of the support member on the front surface side.

According to another aspect of the solid-state imaging device according to the present technology, in the solid-state imaging device, at at least one of the substrate or the support member, a hole penetrating in a plate thickness direction of the substrate and used for at least one of alignment of a mounted component on the substrate or attachment of the substrate to an external device is formed outside an arrangement region of the solid-state imaging element.

According to another aspect of the solid-state imaging device according to the present technology, in the solid-state imaging device, a recess is formed on the back surface side of the substrate such that at least a part of the recess is positioned in an arrangement region of the solid-state imaging element.

According to another aspect of the solid-state imaging device according to the present technology, in the solid-state imaging device, a stepped portion corresponding to a height of the plurality of connectors is formed on the back surface side of the substrate.

An electronic apparatus according to the present technology includes, a solid-state imaging device including: a solid-state imaging element in which one plate surface side of a semiconductor substrate is a light receiving side; a substrate on which the solid-state imaging element is mounted on a front surface that is one plate surface; a support member provided on the front surface side of the substrate so as to surround the solid-state imaging element; and a plurality of connectors provided on a back surface that is another plate surface of the substrate and positioned outside an arrangement region of the solid-state imaging element on the substrate, in which at least a part of the connector is positioned outside an arrangement region of the support member on the substrate.

MODE FOR CARRYING OUT THE INVENTION

Figure 1:
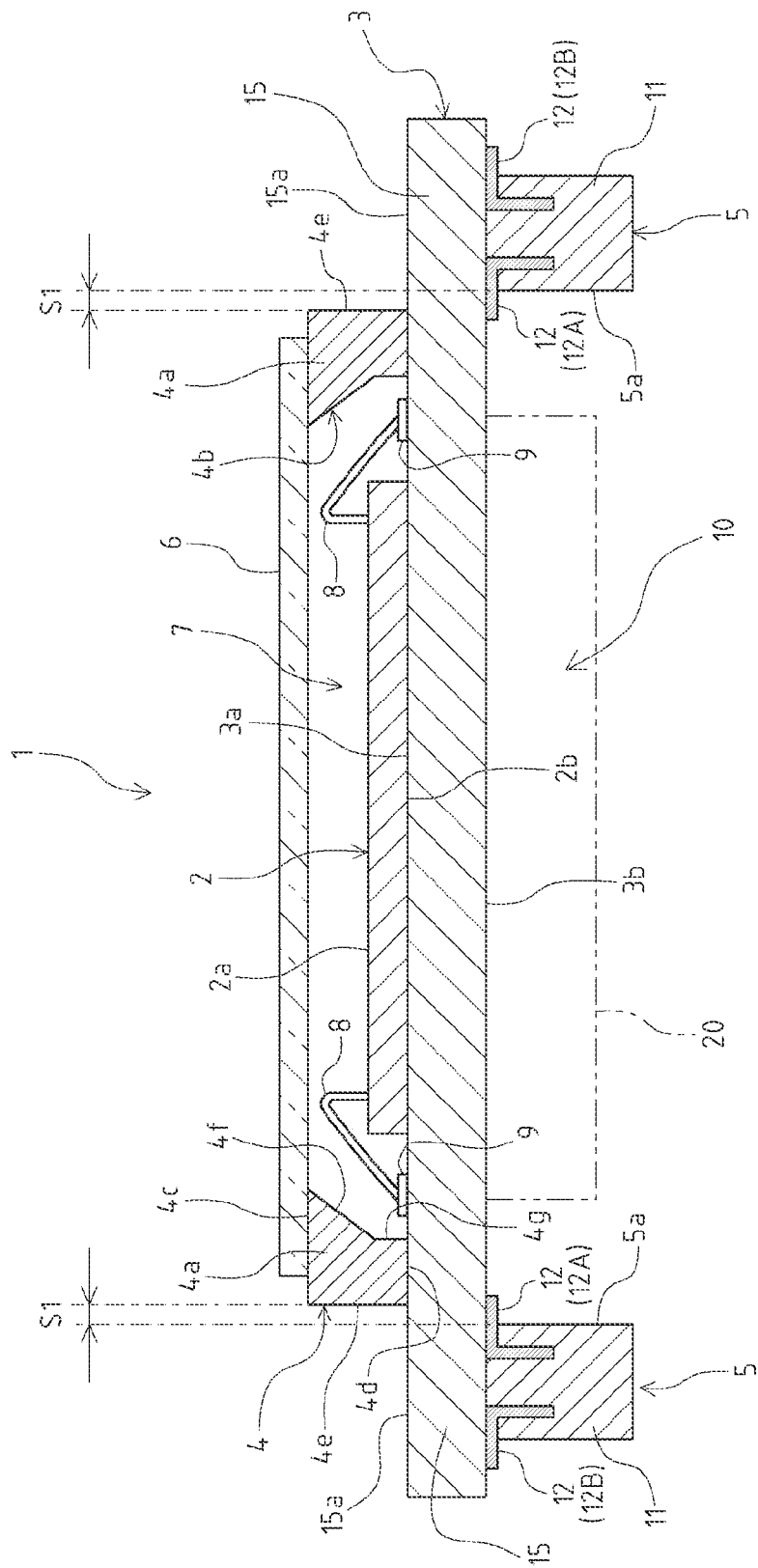
FIG. 1 is a side cross-sectional view illustrating a configuration of a solid-state imaging device according to a first embodiment of the present technology.

The present technology is intended to achieve heat dissipation of a solid-state imaging element with a simple configuration by devising an arrangement configuration of a frame, a connector, and the like with respect to a substrate on which the solid-state imaging element is mounted, suppress an increase in package size, and suppress a transmission delay of a high-speed interface.

Hereinafter, modes for carrying out the present technology (hereinafter, referred to as "embodiments") will be described with reference to the drawings. Note that the description will be given in the following order.

1. Configuration example of solid-state imaging device according to first embodiment
2. Method of manufacturing solid-state imaging device according to first embodiment
3. Method of mounting solid-state imaging device according to first embodiment
4. Modification of solid-state imaging device according to first embodiment
5. Configuration example of solid-state imaging device according to second embodiment
6. Modification of solid-state imaging device according to second embodiment
7. Configuration example of solid-state imaging device according to third embodiment
8. Configuration example of solid-state imaging device according to fourth embodiment
9. Configuration example of solid-state imaging device according to fifth embodiment
10. Configuration example of electronic apparatus <1. Configuration Example of Solid-State Imaging Device According to First Embodiment>

Figure 2:
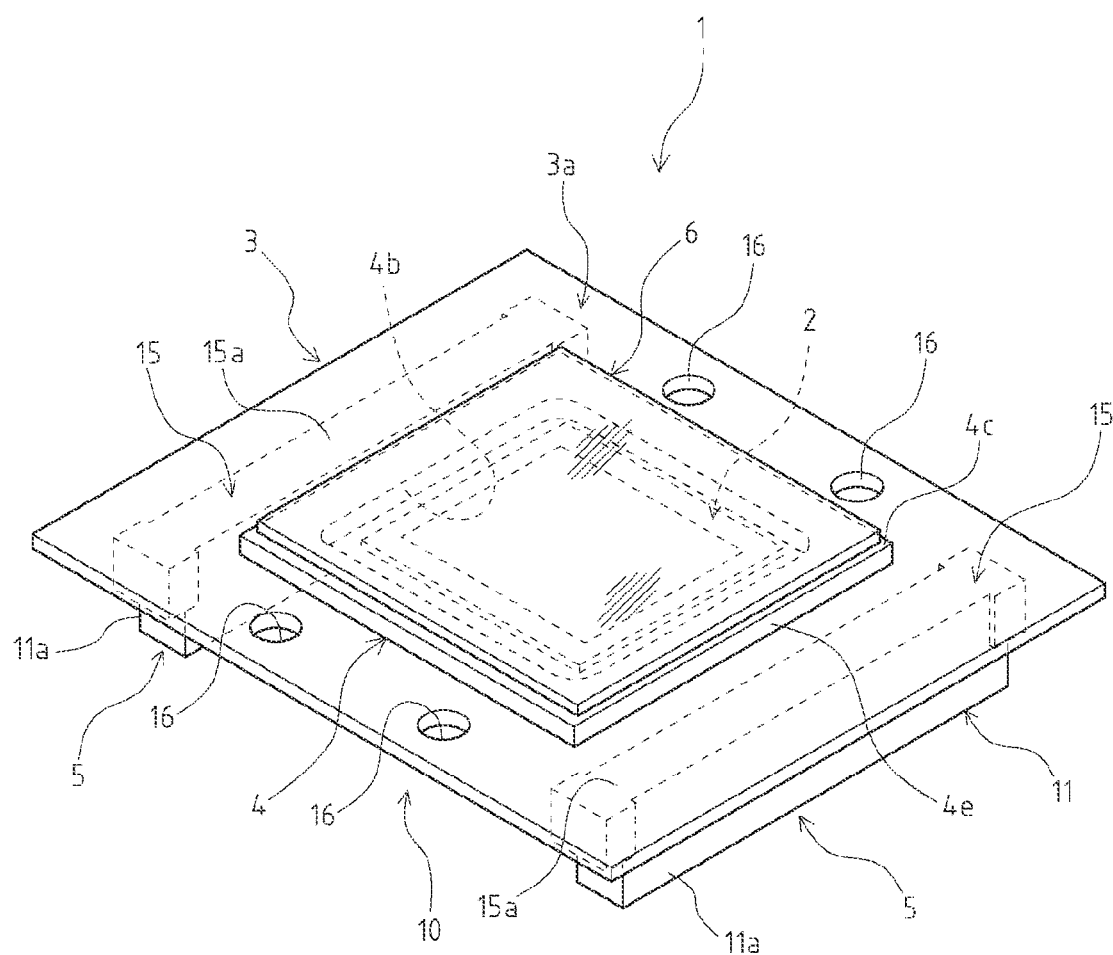
FIG. 2 is a perspective view illustrating a configuration of the solid-state imaging device according to the first embodiment of the present technology.
Figure 3:
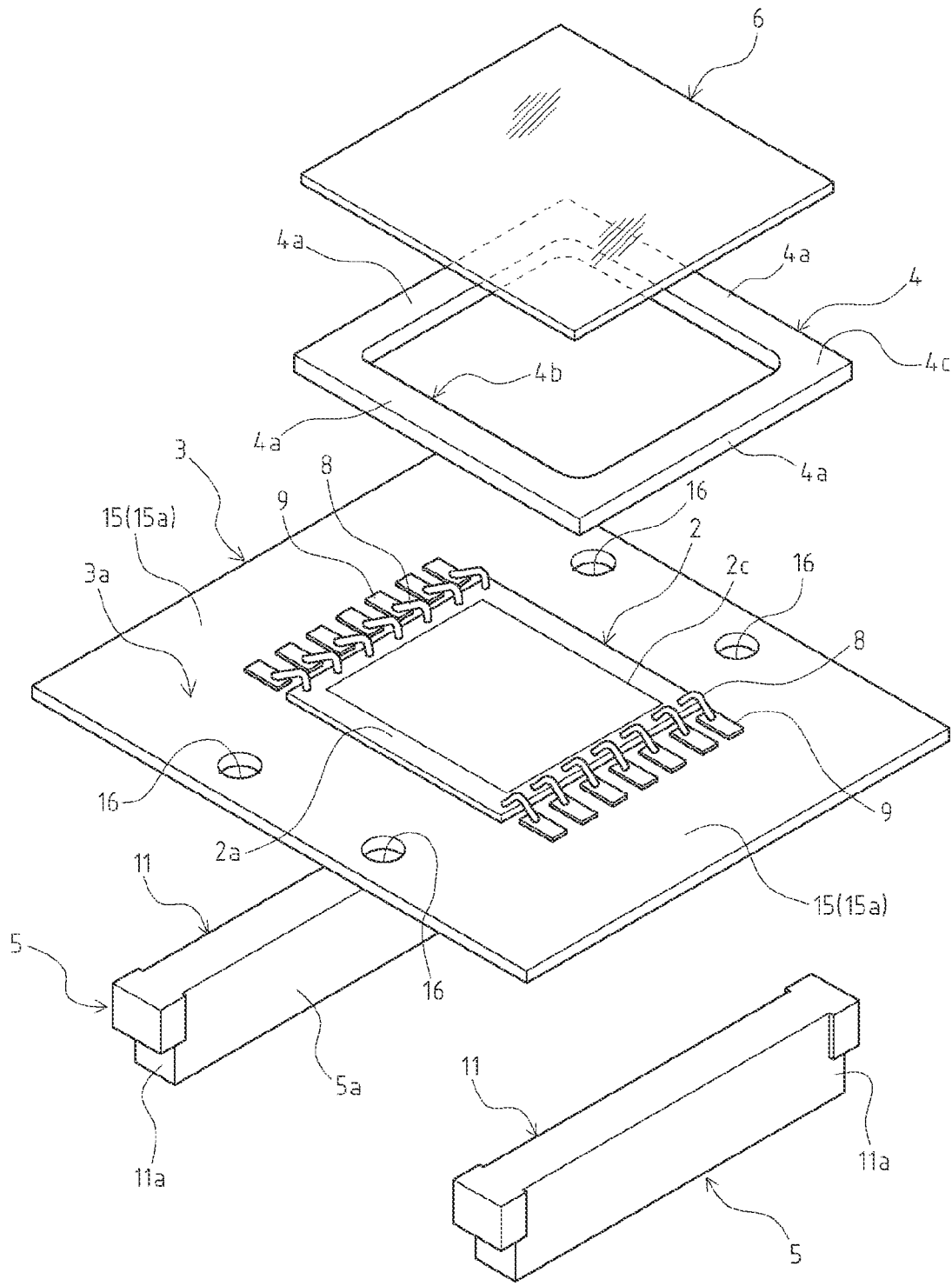
FIG. 3 is an exploded perspective view illustrating a configuration of the solid-state imaging device according to the first embodiment of the present technology.

A configuration example of a solid-state imaging device 1 according to a first embodiment of the present technology will be described with reference to FIGS. 1 to 3. As illustrated in FIGS. 1 to 3, the solid-state imaging device 1 includes an image sensor 2 as a solid-state imaging element, a substrate 3 on which the image sensor 2 is mounted, a frame 4 as a support member provided on the substrate 3, and a plurality of connectors 5 for electrically connecting the solid-state imaging device 1 to an external device. Furthermore, the solid-state imaging device 1 includes glass 6 as a translucent member supported on the frame 4.

The solid-state imaging device 1 has a package structure in which the glass 6 is mounted on the substrate 3 via the frame 4, and a cavity 7 as a hollow portion is provided between the image sensor 2 and the glass 6. That is, the glass 6 is provided above the image sensor 2 so as to face the image sensor 2, and the cavity 7, which is a sealed space formed by the frame 4 and the glass 6, is formed on the substrate 3.

Further, a plurality of connectors 5 is provided on the substrate 3 on the side opposite to the image sensor 2 side. As described above, the solid-state imaging device 1 is configured as an image sensor connector package.

The image sensor 2 includes a semiconductor substrate made of silicon (Si), which is an example of a semiconductor, and one plate surface side (upper side in FIG. 1) of the semiconductor substrate is a light receiving side. The image sensor 2 is a rectangular plate-shaped chip, and has a plate surface on the light receiving side as a front surface 2a and a plate surface on the opposite side as a back surface 2b.

The image sensor 2 uses a die bond material or the like, and is mounted in a central portion on the substrate 3 with the back surface 2b side as the substrate 3 side. The image sensor 2 according to the present embodiment is a complementary metal oxide semiconductor (CMOS)-type image sensor. However, the image sensor 2 may be a charge coupled device (CCD) type image sensor.

Most of the image sensor 2 is constituted by a semiconductor substrate, and an image sensor element is formed on the front surface 2a side. The image sensor 2 has, on the front surface 2a side, a pixel region 2c, which is a light receiving region including a large number of pixels formed in a predetermined array such as a Bayer array, for example, as a light receiving unit, and a region around the pixel region 2c is set as a peripheral region. The pixel region 2c includes an effective pixel region for generating, amplifying, and reading signal charges by photoelectric conversion in each pixel. The pixel in the pixel region 2c includes a photodiode as a photoelectric conversion unit having a photoelectric conversion function, and a plurality of pixel transistors.

On the front surface 2a side of the image sensor 2, a color filter and an on-chip lens are formed corresponding to each pixel via an antireflection film made of an oxide film or the like, a planarization film formed of an organic material, or the like with respect to the semiconductor substrate. The light incident on the on-chip lens is received by the photodiode via a color filter, a planarization film, or the like.

Examples of the configuration of the image sensor 2 include a front side illumination type in which a pixel region 2c is formed on a front surface side of a semiconductor substrate, a back side illumination type in which a photodiode or the like is reversely arranged and a back surface side of the semiconductor substrate is a light receiving surface side in order to improve light transmittance, and a single chip in which peripheral circuits of a pixel group are stacked. However, the image sensor 2 according to the present technology is not limited to those having these configurations.

The substrate 3 has a rectangular plate-shaped outer shape as a whole, and has a front surface 3a which is one plate surface on which the image sensor 2 is mounted and a back surface 3b which is the other plate surface on the opposite side. The substrate 3 constitutes a portion where the image sensor 2 is mounted on the front surface 3a in the solid-state imaging device 1. In the following description, in the solid-state imaging device 1, a longitudinal direction (left-right direction in FIG. 1) of the rectangular plate-shaped substrate 3 is defined as a left-right direction, a direction orthogonal to the left-right direction in plan view is defined as a front-rear direction, and a plate thickness direction (up-down direction in FIG. 1) of the substrate 3 is defined as an up-down direction.

The substrate 3 is formed by providing a wiring layer, an electrode, and the like on a base material formed of, for example, an organic material such as plastic or a material such as ceramics. The substrate 3 according to the present embodiment is, for example, a ceramic substrate containing aluminum oxide as a main component.

The image sensor 2 and the substrate 3 are electrically connected by a bonding wire 8 as a connection member. The bonding wire 8 is provided so as to straddle between the front surface 2a of the image sensor 2 and the front surface 3a of the substrate 3 while forming a curved shape or a bent shape protruding upward, such as an arch shape.

The bonding wire 8 is a metal thin wire made of, for example, Au (gold) or Cu (copper). The bonding wire 8 electrically connects an electrode (not illustrated) formed on the front surface 2a of the image sensor 2 and a pad electrode 9 formed on the front surface 3a of the substrate 3. A plurality of bonding wires 8 is provided corresponding to the number of pad electrodes 9. The pad electrode 9 is formed of, for example, an aluminum material.

The frame 4 is provided on the front surface 3a side of the substrate 3 so as to surround the image sensor 2. The frame 4 is an integral member made of a resin material or a metal material. The frame 4 may have a composite structure having a portion made of a metal material and a portion made of a resin material.

The frame 4 is a rectangular or square frame-shaped member, and has an outer dimension larger than the planar view outer shape of the image sensor 2 and smaller than the planar view outer shape of the substrate 3. The frame 4 has four linear side portions 4a having the frame shape, and the four side portions 4a form a rectangular opening 4b. A size of a planar-view outer shape of the opening 4b is larger than a planar-view outer shape of the image sensor 2. The frame 4 is provided so as to surround the image sensor 2 along the outer shape of the rectangular image sensor 2.

Each of the frames 4 has an upper surface 4c and a lower surface 4d along a horizontal plane. The outer side surface 4e of the frame 4 is a surface along the vertical direction. On the other hand, in the frame 4, with respect to the inner surface forming the opening 4b, an upper portion is an inclined surface portion 4f inclined from the outside to the inside from the lower side to the upper side in a side cross-sectional view (cross-sectional view), and a lower portion of the inclined surface portion 4f is a lower surface portion 4g along the vertical direction.

Due to such a shape of the inner side surface of the frame 4, the cavity 7 widens the lower space thereof with respect to the upper space, and the opening area of the opening 4b on the upper surface 4c side is smaller than the opening area of the opening 4b on the lower surface 4d side. However, the shape of the inner side surface of the frame 4 is not limited to the present embodiment. In addition, the frame 4 is a frame-shaped integrated member, but may be a portion configured by a plurality of members forming a part of a rectangular frame shape.

The frame 4 is provided on the front surface 3a of the substrate 3 such that the entire pixel region 2c is positioned within the opening range of the opening 4b in plan view with respect to the image sensor 2 mounted on the substrate 3. Furthermore, the frame 4 is provided without interfering with the bonding wire 8 and the pad electrode 9. The frame 4 is fixed on the front surface 3a of the substrate 3 with an adhesive such as an epoxy resin adhesive or an acrylic resin adhesive. In the frame 4, the upper surface 4c is a surface that supports the glass 6.

The glass 6 is an example of a transparent member and has a rectangular plate-shaped outer shape. The glass 6 is larger than the image sensor 2, and has substantially the same outer dimension as the outer dimension of the frame 4 in plan view, corresponding to the frame 4. The glass 6 is provided on the frame 4 so as to be provided parallel to the image sensor 2 at a predetermined interval on the light receiving side of the image sensor 2. The glass 6 is fixed to the frame 4 with an adhesive or the like.

The glass 6 is provided to cover the entire opening 4b from above with respect to the frame 4. Therefore, the glass 6 has an outer dimension larger than the opening dimension of the opening 4b. As described above, the glass 6 is provided above the image sensor 2 so as to face the front surface 2a of the image sensor 2 via the opening 4b.

The glass 6 normally transmits various kinds of light incident from an optical system such as a lens positioned above the glass 6. The light transmitted through the glass 6 reaches the light receiving surface of the image sensor 2 via the cavity 7. The glass 6 has a function of protecting the light receiving surface side of the image sensor 2 and a function of blocking entry of moisture (water vapor), dust, and the like from the outside into the cavity 7 in combination with the frame 4. Note that, instead of the glass 6, for example, a plastic plate, a silicon plate that transmits only infrared light, or the like can be used.

The connector 5 is a plug for electrically connecting the solid-state imaging device 1 to an external device. The connector 5 is provided on the back surface 3b of the substrate 3 and is positioned outside the arrangement region of the image sensor 2 on the substrate 3. Here, the arrangement region of the image sensor 2 on the substrate 3 is a portion occupied by the planar-view outer shape of the image sensor 2 in a plate-surface view (plan view) of the substrate 3, and is specified in a plane along which the plate surface of the substrate 3 is arranged.

That is, the connector 5 is provided on the substrate 3 at a portion outside the image sensor 2 so as not to overlap the image sensor 2 in plan view. The connectors 5 are provided at two positions on the left and right ends on the back surface 3b side of the substrate 3.

The connector 5 has a substantially quadrangular prism-shaped outer shape having a substantially rectangular cross-sectional shape, and is provided such that a longitudinal direction thereof is arranged along both left and right sides of the rectangular outer shape of the substrate 3. The two connectors 5 are arranged so as to follow edges on both left and right sides of the substrate 3, and are provided so as to be parallel to each other. On the back surface 3b side of the substrate 3, the connector 5 forms a protruding portion protruding longitudinally from the back surface 3b along the edge of the substrate 3.

According to such an arrangement mode of the connectors 5, the cavity 10 is formed between the left and right connectors 5 on the back surface 3b side of the substrate 3. The cavity 10 is a space portion formed by the back surface 3b of the substrate 3 and the inner side surfaces 5a of the left and right connectors 5, and exists in an area immediately below the image sensor 2 via the substrate 3.

The connector 5 includes a resin-made connector main body portion 11 which is a base portion forming an outer shape of the connector 5, and a plurality of wiring portions 12 which are metal-made lead portions arranged at predetermined portions with respect to the connector main body portion 11. The connector 5 is an electrical connection portion to a circuit board or the like on which the solid-state imaging device 1 is mounted.

The connector main body portion 11 has a fitting portion 11a with respect to a fitted portion that receives the fitting of the connector 5 on the lower side thereof. The fitting portion 11a has a predetermined fitting shape corresponding to the fitted portion.

The wiring portion 12 is electrically connected to the pad electrode 9 on the front surface 3a side of the substrate 3 by a wiring portion formed as a structural portion of the substrate 3. The connector 5 is mounted on the back surface 3b of the substrate 3 by soldering so as to electrically connect the wiring portion 12 to the wiring portion formed on the substrate 3.

The wiring portions 12 are provided in two rows so as to be arranged in the longitudinal direction (front-rear direction) of the connector 5. Among the two rows of wiring portions 12, a wiring portion 12A on the inner side in the left-right direction is arranged close to the image sensor 2 in the left-right direction. On the other hand, a wiring portion 12B on the outer side in the left-right direction is arranged in an area on the outer side of the frame 4 in the left-right direction, where a load to push the connector 5 in a direction to be fitted to the fitted portion is applied.

In the solid-state imaging device 1 having the above configuration, the light transmitted through the glass 6 passes through the cavity 7, and is received and detected by the light receiving element constituting each pixel arranged in the pixel region 2c of the image sensor 2.

In the solid-state imaging device 1 having the above-described configuration, at least a part of the connector 5 is positioned outside the arrangement region of the frame 4 on the substrate 3. Here, the arrangement region of the frame 4 on the substrate 3 is a portion occupied by the planar-view outer shape in plan view, and is specified in a plane along the plate surface of the substrate 3.

In the present embodiment, the connector 5 is provided such that the entire connector main body portion 11 is positioned outside the arrangement region of the frame 4 on the substrate 3. That is, the connector 5 is provided on the substrate 3 at a portion outside the frame 4 such that the connector main body portion 11 does not overlap the frame 4 in plan view. In other words, the connector 5 is provided such that the inner side surface 5a, which is the inner side surface of the connector main body portion 11, is positioned more on the left and right outer sides than the side surfaces 4e of the side portions 4a on the left and right sides of the frame 4, and an interval S1 exists between the side surface 4e and the inner side surface 5a in the left and right direction (see FIG. 1).

Regarding the arrangement position of the connector 5 on the back surface 3b of the substrate 3, the connector 5 is preferably arranged at a position close to the image sensor 2 from the viewpoint of suppressing an increase in the wiring length between the image sensor 2 and the connector 5. Based on such a viewpoint, the connector 5 is arranged in a region where there is no component on the front surface 3a which is a surface opposite to the back surface 3b which is an installation surface thereof. A projection portion of the arrangement region of the connector 5 on the front surface 3a of the substrate 3 is a portion that receives an action of a load in a direction (downward direction) of pushing the connector 5 when the connector 5 is fitted to the fitted portion.

As described above, the substrate 3 includes a pressed portion 15 that receives a load for fitting the connector 5 to the fitted portion with respect to the connector 5 on the outer side of the arrangement region of the frame 4 on the front surface 3a side. A portion forming the pressed portion 15 on the front surface 3a of the substrate 3 is a pressed surface 15a that receives a load for fitting the connector 5.

In the present embodiment, in the configuration in which the frame 4 is provided so as to follow the outer shape of the image sensor 2 arranged in the central portion of the front surface 3a of the substrate 3, the pressed portion 15 is provided as a part of a flange-shaped overhanging portion of the substrate 3 to the outside from the frame 4. That is, the substrate 3 has a flange portion which is a frame-shaped margin portion in which no component is arranged on the front surface 3a side corresponding to the outer shape of the frame 4 as a region portion on the outer side of the frame 4, and edges on both left and right sides of the flange portion are the pressed portions 15.

As described above, on the substrate 3, the edges along the four sides of the rectangular plate-shaped outer shape are flange portions, and portions of the flange portion on the left and right sides corresponding to the arrangement region of the connector main body portion 11 of the connector 5 are pressed portions 15 having the pressed surfaces 15a.

In addition, on the substrate 3, an edge end portion forming an edge end along the outer shape of the substrate 3 exists as a portion further outside the arrangement region of the connector 5. That is, the connector 5 is arranged at a position slightly inside the edge ends on the left and right sides of the substrate 3, and the edge ends on the left and right sides of the substrate 3 extend to the left and right outer sides of the arrangement region of the connector 5.

In the present embodiment, the margin portion that is the outer portion of the frame 4 on the substrate 3 is provided as a frame-shaped portion over the entire circumference of the substrate 3, but it is sufficient that the margin portion that becomes the pressed portion 15 is provided at least at a portion corresponding to the arrangement region of the connector 5. In the present embodiment in which the connectors 5 are arranged in the vicinity of the edges on the left and right sides of the substrate 3, it is sufficient that the margin portion as the pressed portion 15 is provided at least at the edges on the left and right sides.

Furthermore, in the solid-state imaging device 1, a hole 16 penetrating in the plate thickness direction of the substrate 3 is formed on the substrate 3 outside the arrangement region of the image sensor 2. The hole 16 is a portion in which a circular hole penetrating from the front surface 3a to the back surface 3b of the substrate 3 is formed.

In the present embodiment, two holes 16 are formed at edges of two sides other than the edges along which the pressed portions 15 on both the left and right sides, that is, the edges on both the front and rear sides are arranged, in the margin portion on the outer side of the frame 4 on the substrate 3. In each of the front and rear edges of the substrate 3, the two holes 16 are provided at an intermediate portion in the left-right direction at a predetermined interval in the left-right direction. Specifically, the two holes 16 are provided at positions on the left and right sides within the range of the arrangement region of the frame 4 in the left-right direction.

It is sufficient that the formation portion of the hole 16 in the substrate 3 is a portion outside the arrangement region of the image sensor 2 and is a portion that does not interfere with the frame 4. In addition, the number and size (hole diameter) of the holes 16 are not particularly limited. Furthermore, the hole shape of the hole 16 may be a shape other than a circular shape such as a polygonal shape such as a quadrangular shape or an elliptical shape.

In the substrate 3 which is a ceramic substrate, the holes 16 are formed by making holes to be the holes 16 in the sheet member before being fired in the manufacturing process of the substrate 3. However, a method of forming the hole 16 is not particularly limited. Depending on the material of the substrate 3 and the like, for example, a method of forming the hole 16 by performing drilling on a plate-shaped substrate member to be the substrate 3 may be used.

The hole 16 is used for at least one of alignment of a mounted component on the substrate 3 or attachment of the substrate 3 to an external device to which the solid-state imaging device 1 is attached.

When the hole 16 is used for alignment of the mounted component, the hole 16 is used as follows. For example, when the image sensor 2 and the connector 5 are mounted on the substrate 3, the mounting components are aligned by image recognition using an image acquired by imaging the substrate 3. In this image recognition, the image portion of the hole 16 of the substrate 3 is used as a reference of the position, and the image sensor 2 and the connector 5 are aligned.

Furthermore, when the hole 16 is used for attachment of the substrate 3 to an external device, the hole 16 is used as follows. For example, in a case where the solid-state imaging device 1 is mounted on a camera as an external device, a substrate support portion for fixing the substrate 3 is provided on a housing side constituting the camera. A fastening tool such as a screw is used to fix the substrate 3 to the substrate support portion of the housing. Here, the hole 16 of the substrate 3 is used as a fastening hole through which the fastening tool passes, and the substrate 3 is fixed to the substrate support portion of the housing.

In addition, there is a configuration in which the substrate 3 is fixed to the substrate support portion of the housing of the camera via a predetermined mounting member. That is, the substrate 3 is fixed to the mounting member fixed to the substrate support portion of the housing, and the substrate 3 is indirectly fixed. In such a configuration, the hole 16 is used as a fastening hole for fixing to the mounting member. Furthermore, for example, in a configuration in which a fixing or positioning pin is provided on the housing side of the camera, the hole 16 is used as a locking hole through which the pin passes.

<2. Method of Manufacturing Solid-State Imaging Device According to First Embodiment>

An example of a method of manufacturing the solid-state imaging device 1 according to the first embodiment of the present technology will be described with reference to FIGS. 4 and 5.

Figure 4A:
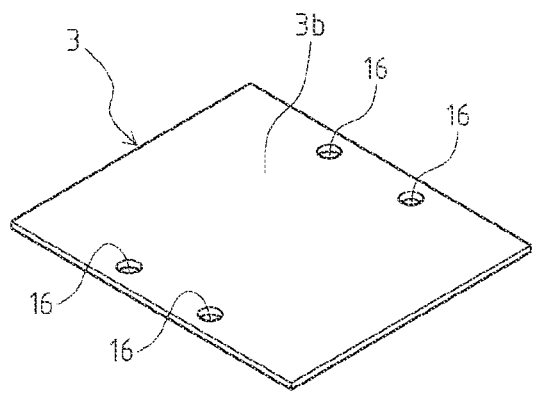
FIGS. 4A, 4B and 4C are explanatory diagrams of a method of manufacturing the solid-state imaging device according to the first embodiment of the present technology.

First, as shown in FIG. 4A, a step of preparing a substrate 3 which is a ceramic substrate having holes 16 is performed. The holes 16 are formed by making holes to be the holes 16 in the sheet member before being subjected to firing in the firing step included in the manufacturing process of the substrate 3. In the present embodiment, the holes 16 are provided at a total of four positions, two at each of the left and right intermediate portions of the edges on both the front and rear sides of the substrate 3.

Figure 4B:
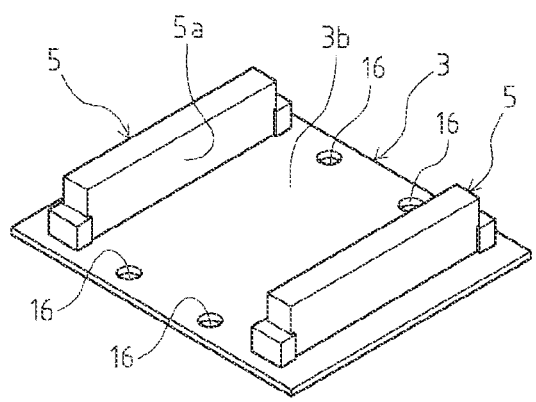

Next, as illustrated in FIG. 4B, a step of mounting the connector 5 on the back surface 3b of the substrate 3 is performed. The connector 5 is bonded to the substrate 3 by solder. In this step, the connector 5 is mounted on the substrate 3 by reflow processing for melting solder. As a result, the plurality of wiring portions 12 included in the connector 5 is electrically connected to the predetermined wiring portions formed facing the back surface 3b of the substrate 3, respectively. In the present embodiment, the connector 5 having a substantially quadrangular prism-shaped outer shape is mounted at two positions on the left and right sides of the substrate 3 so as to follow the edge of the substrate 3.

In mounting the connector 5 on the substrate 3, the hole 16 of the substrate 3 is used as a reference of the position. That is, in the positioning of the connector 5 on the substrate 3 using image recognition, the image portion of the hole 16 in the captured image is used as a position reference regarding the mounting position of the connector 5. This enables highly accurate mounting with respect to the position of the connector 5 on the substrate 3.

Figure 4C:
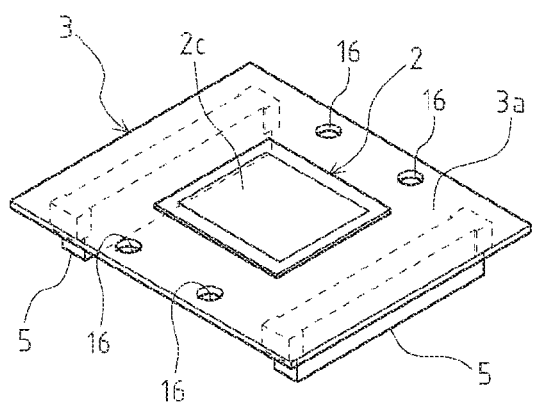

Next, as illustrated in FIG. 4C, a step of mounting the image sensor 2 on the front surface 3a of the substrate 3 is performed. In this step, the image sensor 2 is die-bonded to a predetermined position by a die bonding material with the back surface 2b side as a lower side with respect to the front surface 3a of the substrate 3, whereby the image sensor 2 is adhered and fixed. In the present embodiment, the rectangular plate-shaped image sensor 2 is mounted on the central portion of the front surface 3a of the substrate 3 so that the outer shape of the rectangular plate-shaped image sensor 2 follows the outer shape of the rectangular plate-shaped substrate 3.

In mounting the image sensor 2 on the substrate 3, the hole 16 of the substrate 3 is used as a reference of the position. That is, in the positioning of the image sensor 2 on the substrate 3 using image recognition, the image portion of the hole 16 in the captured image is used as a position reference regarding the mounting position of the image sensor 2. As a result, highly accurate mounting can be performed with respect to the position of the image sensor 2 on the substrate 3.

Figure 5A:
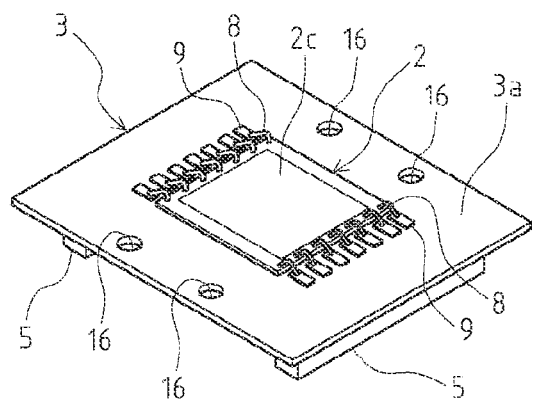
FIGS. 5A, 5B and 5C are explanatory diagrams of the method of manufacturing the solid-state imaging device according to the first embodiment of the present technology.

Subsequently, as illustrated in FIG. 5A, a step of providing a bonding wire 8 between the front surface 2a of the image sensor 2 and the front surface 3a of the substrate 3 is performed. That is, the plurality of electrodes formed on the front surface 2a of the image sensor 2 and the plurality of pad electrodes 9 formed on the front surface 3a of the substrate 3 are electrically connected by the bonding wires 8. The bonding wire 8 is wired so as to have a predetermined shape protruding upward, such as an arch shape.

Figure 5B:
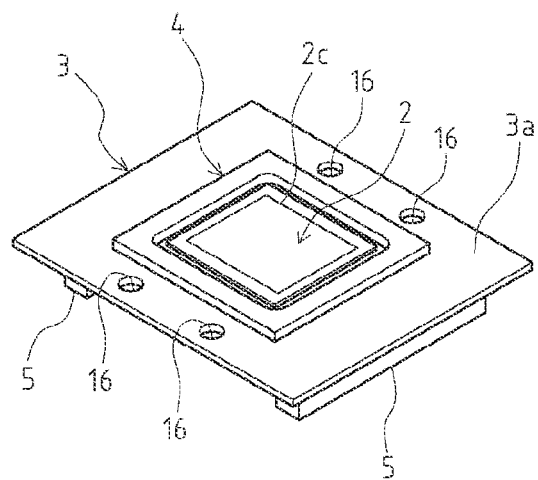

Next, as illustrated in FIG. 5B, a step of attaching the frame 4 is performed. In this step, the frame 4 is adhered and attached onto the front surface 3a of the substrate 3 on which the image sensor 2 is mounted in accordance with the position of the image sensor 2. The frame 4 is fixed with a resin adhesive or the like so as to follow the outer shape of the image sensor 2 with the lower surface 4d as an adhesion surface to the front surface 3a of the substrate 3.

Figure 5C:
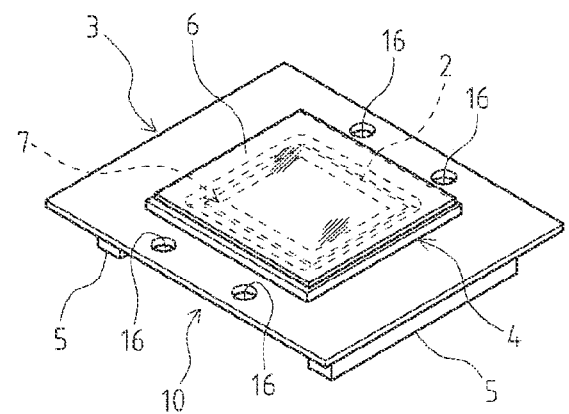

Then, as illustrated in FIG. 5C, a step of glass sealing for attaching the glass 6 is performed. That is, the glass 6 is attached and fixed to the upper surface 4c of the frame 4 with an adhesive or the like so as to cover the entire opening 4b from above. As a result, the upper side of the frame 4 is glass-sealed, and the cavity 7, which is a sealed space, is formed by the frame 4 and the glass 6 in the mounting portion of the image sensor 2 on the substrate 3.

Through the manufacturing process as described above, the solid-state imaging device 1 is obtained. In the solid-state imaging device 1, the image sensor 2 is mounted in a hollow portion formed by the frame 4 and the glass 6 on the front surface 3a side of the substrate 3, and two connectors 5 are mounted on the back surface 3b side, thereby forming a cavity 10 in an area immediately below the image sensor 2. By adopting such a package structure, a heat dissipation member such as a heat dissipation plate can be attached directly below the image sensor 2.

<3. Method of Mounting Solid-State Imaging Device According to First Embodiment>

Figure 6A:
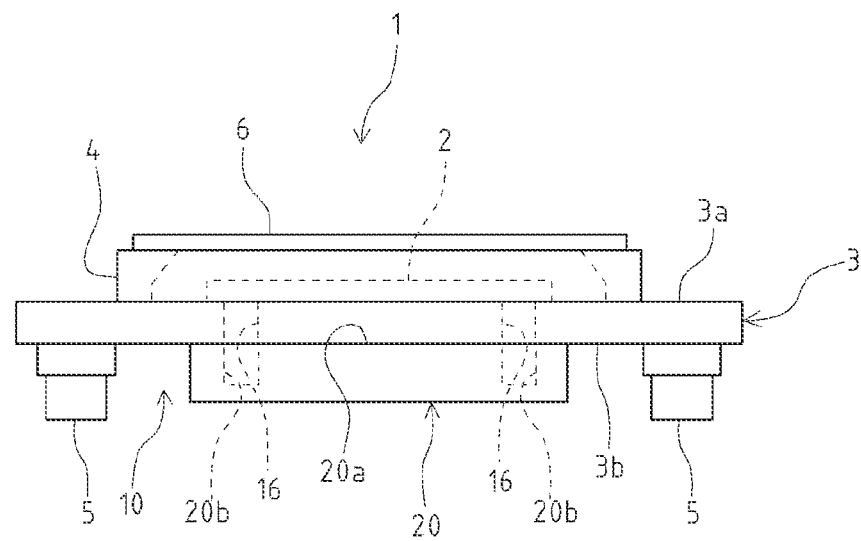
FIGS. 6A and 6B are explanatory diagrams of an example of a method of mounting the solid-state imaging device according to the first embodiment of the present technology.
Figure 6B:
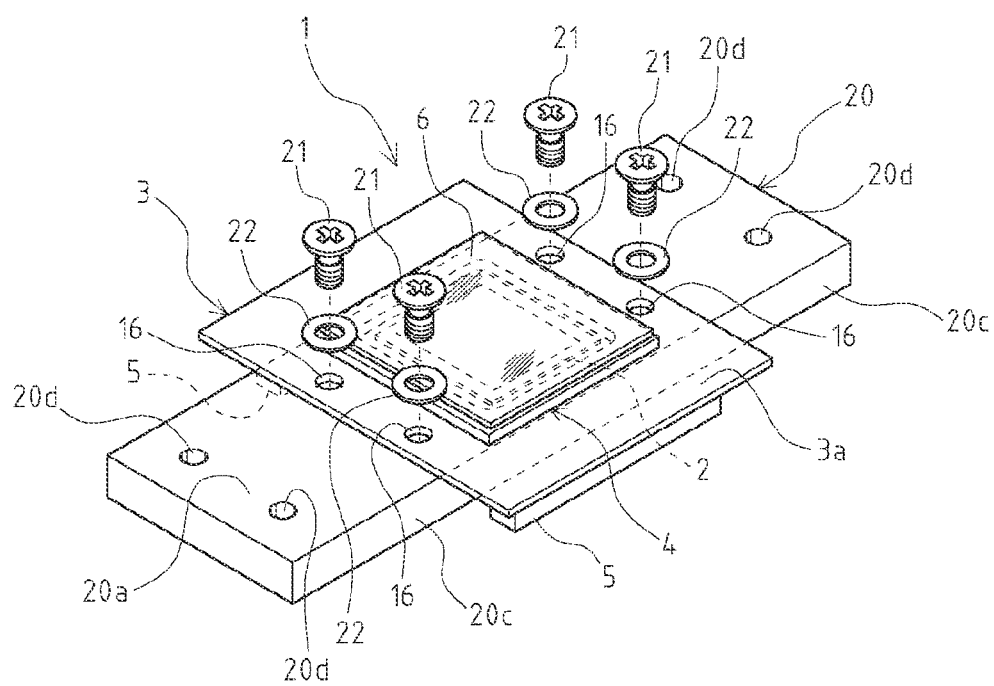
Figure 7A:
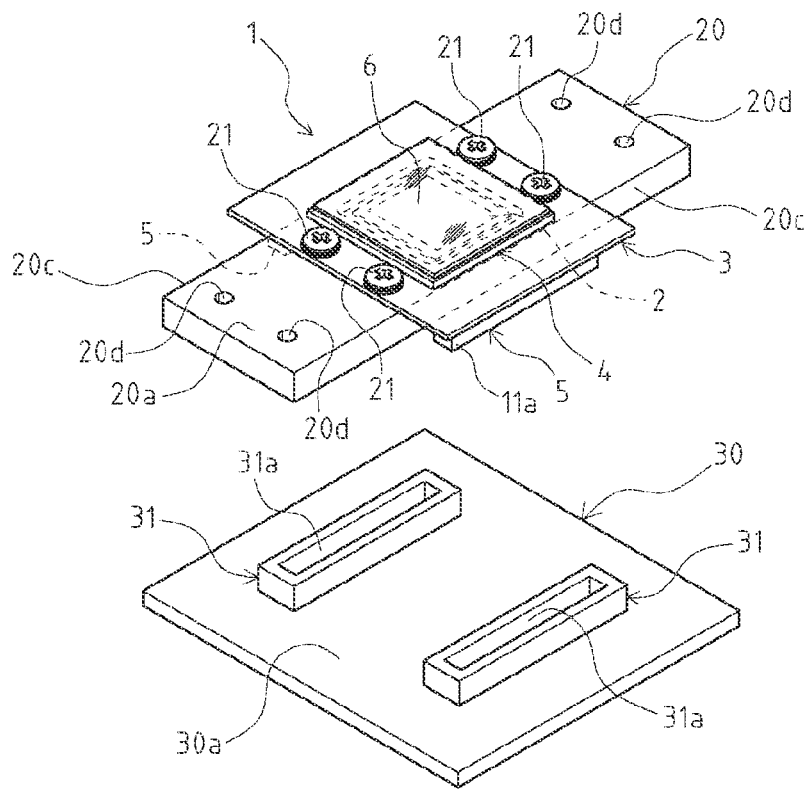
FIGS. 7A and 7B are explanatory diagrams of an example of the method of mounting the solid-state imaging device according to the first embodiment of the present technology.

An example of a method of mounting the solid-state imaging device 1 according to the first embodiment of the present technology will be described with reference to FIGS. 6 to 8. FIG. 6A is a front view of the solid-state imaging device 1 illustrating a state in which a heat dissipation plate 20 is attached, and FIG. 6B is a perspective view illustrating an attachment structure of the heat dissipation plate 20. FIG. 7A is a perspective view illustrating the solid-state imaging device 1 and a mounting substrate 30 in a state where the heat dissipation plate 20 is mounted. FIG. 8A is a perspective view illustrating a state in which the solid-state imaging device 1 and the mounting substrate 30 are set in the housing 40, and FIG. 8B is a perspective view illustrating a state in which the solid-state imaging device 1 and the mounting substrate 30 are fixed in the housing 40.

As illustrated in FIGS. 6A and 6B, when the solid-state imaging device 1 is mounted on a camera as an external device, a step of attaching the heat dissipation plate 20 to the solid-state imaging device 1 is performed. The heat dissipation plate 20 is provided in a region between the left and right connectors 5 forming the cavity 10 on the back surface 3b of the substrate 3.

The heat dissipation plate 20 is fixed at a predetermined position with respect to the substrate 3 by being fastened by a screw 21 as a fastener with one plate surface 20a as a contact surface with respect to the back surface 3b of the substrate 3. Four holes 16 formed in the substrate 3 are used to fix the heat dissipation plate 20 to the substrate 3. As illustrated in FIG. 6B, the screw 21 penetrates a washer 22 interposed between the screw 21 and the front surface 3a of the substrate 3, penetrates the hole 16 of the substrate 3, and is screwed into a screw hole 20b formed in the heat dissipation plate 20. Note that, in fixing the heat dissipation plate 20 to the substrate 3, adhesion using an adhesive may be used.

The heat dissipation plate 20 is, for example, a rectangular plate-shaped member having an outer dimension larger than that of the image sensor 2, and is provided so as to include an arrangement region of the image sensor 2. In the present example, the heat dissipation plate 20 is a rectangular plate-shaped member whose longitudinal direction is the front-rear direction, has a longer dimension than the substrate 3 in the longitudinal direction, and has portions on both the front and rear sides as extending portions 20c protruding from the substrate 3. The heat dissipation plate 20 is made of a metal having high thermal conductivity, such as copper, brass, or aluminum.

Figure 7B:
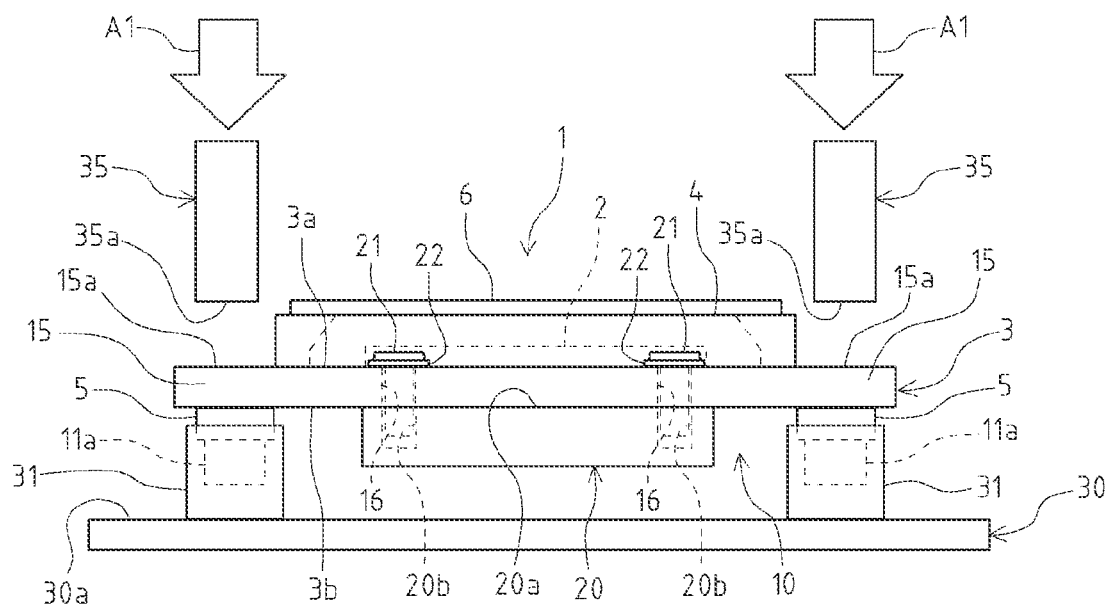
Figure 8A:
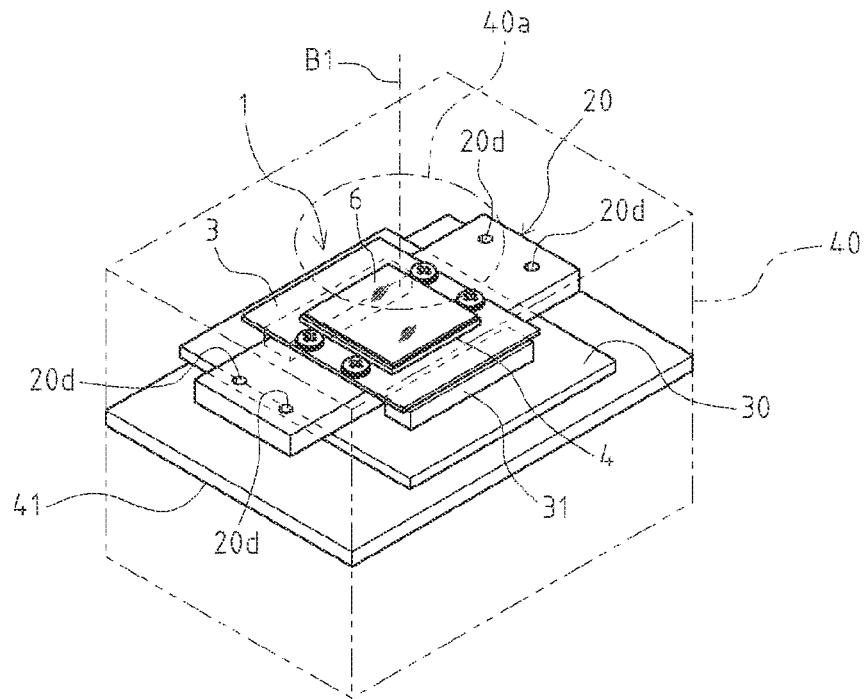
FIGS. 8A and 8B are explanatory diagrams of an example of the method of mounting the solid-state imaging device according to the first embodiment of the present technology.
Figure 8B:
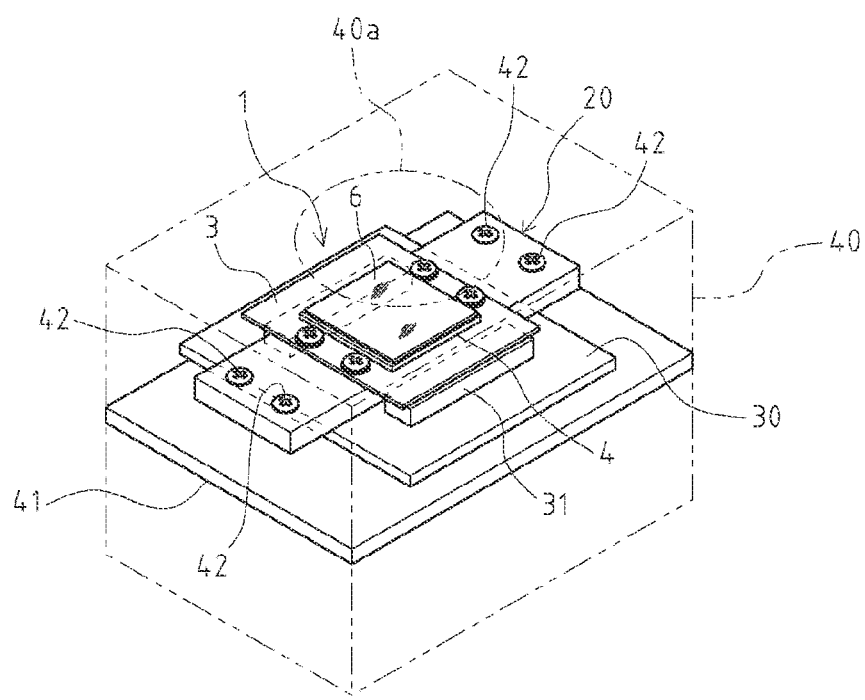

As illustrated in FIGS. 7A and 7B, the solid-state imaging device 1 to which the heat dissipation plate 20 is attached is mounted on the mounting substrate 30 which is a substrate on the camera side. On the mounting substrate 30, a reception side connector 31 which is a fitted portion for receiving fitting of the connector 5 is provided on a front surface 30a which is a plate surface for receiving mounting of the solid-state imaging device 1. The connectors 31 are provided at two positions on the front surface 30a of the mounting substrate 30 in a positional relationship corresponding to the arrangement of the two connectors 5 on the substrate 3.

The connector 31 is a receptacle for the connector 5 and has a fitting recess 31a that receives insertion of the fitting portion 11a of the connector 5. When the fitting portion 11a of the connector 5 is inserted into the fitting recess 31a of the connector 31, the connector 5 and the connector 31 are fitted to each other, and the substrate 3 and the mounting substrate 30 are electrically connected to each other.

As illustrated in FIG. 7B, in the step of fitting the connector 5 of the solid-state imaging device 1 to the connector 31 of the mounting substrate 30, the pressed portion 15 of the substrate 3 is a portion that receives an action of a load for pushing and fitting the connector 5 into the connector 31. In a state in which the solid-state imaging device 1 is set on the mounting substrate 30 such that each connector 5 is positioned on the corresponding connector 31, the pressed portion 15 receives an action of a downward load as a pressing force from the front surface 3a side of the substrate 3 by the predetermined pressing member 35, and the connector 5 is inserted into the connector 31 to be fitted to each other.

The pressing member 35 has a planar pressing surface 35a on one side. The pressing surface 35a is a contact surface of the pressed portion 15 with respect to the pressed surface 15a in the pressing action of the pressing member 35 with respect to the substrate 3. The pressing member 35 is provided so as to move downward with a predetermined pressing force by a predetermined drive source in a device used to attach the solid-state imaging device 1 to the mounting substrate 30 (see an arrow A1).

As illustrated in FIG. 8A, the mounting substrate 30 to which the solid-state imaging device 1 is mounted is subjected to optical axis alignment on a predetermined substrate support portion 41 provided in the housing 40 of the camera. That is, the optical axis alignment of the solid-state imaging device 1 with respect to the lens constituting the optical system in the camera is performed.

As the optical axis alignment, for example, alignment of the solid-state imaging device 1 with respect to the lens optical axis B1 in the housing 40 is performed by moving the mounting substrate 30 to which the solid-state imaging device 1 is attached in the housing 40. The surface portion of the housing 40 on one side (the upper side in FIG. 8A) is a light-receiving side surface portion 40a that receives incident light. In the housing 40, the substrate support portion 41 is provided so as to face the light-receiving side surface portion 40a. In the housing 40, the mounting substrate 30 combined with the solid-state imaging device 1 is provided so as to direct the solid-state imaging device 1 toward the light-receiving side surface portion 40a with respect to the substrate support portion 41.

As illustrated in FIG. 8B, after the optical axis alignment of the solid-state imaging device 1 is performed, the heat dissipation plate 20 is fixed by the screw 42. The screw 42 passes through fixing holes 20d formed at two positions in each of front and rear extending portions 20c of the heat dissipation plate 20, and is screwed into a predetermined portion such as substrate support portion 41 in the housing 40. As a result, the solid-state imaging device 1 and the mounting substrate 30 are fixed to a predetermined portion such as the substrate support portion 41 in the housing 40.

Thus, attachment of the solid-state imaging device 1 to the camera is completed. In this example, the hole 16 of the substrate 3 is used for indirect attachment via the heat dissipation plate 20 as attachment of the substrate 3 to the camera. That is, the heat dissipation plate 20 is used as an attachment member fixed to the substrate 3 using the hole portion 16 and fixed to the substrate support portion 41 or the like of the housing 40, and the substrate 3 is attached in the housing 40.

Another example of the method for mounting the solid-state imaging device 1 according to the first embodiment of the present technology will be described with reference to FIGS. 9 and 10.

Figure 9A:
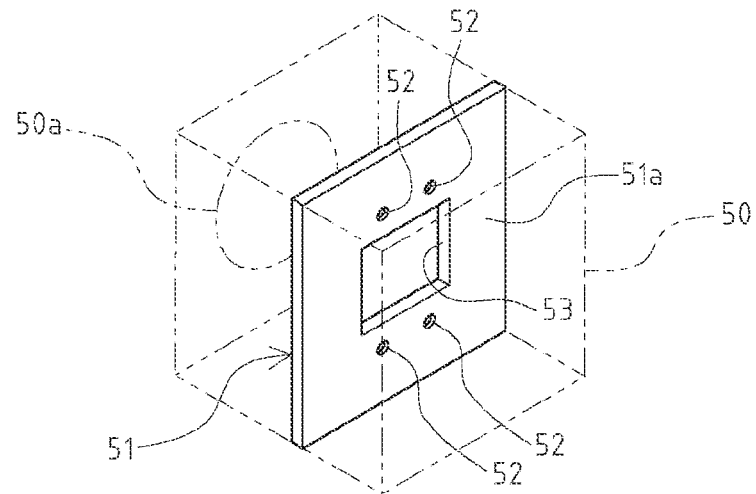
FIGS. 9A, 9B and 9C are explanatory diagrams of another example of the method of mounting the solid-state imaging device according to the first embodiment of the present technology.
Figure 9B:
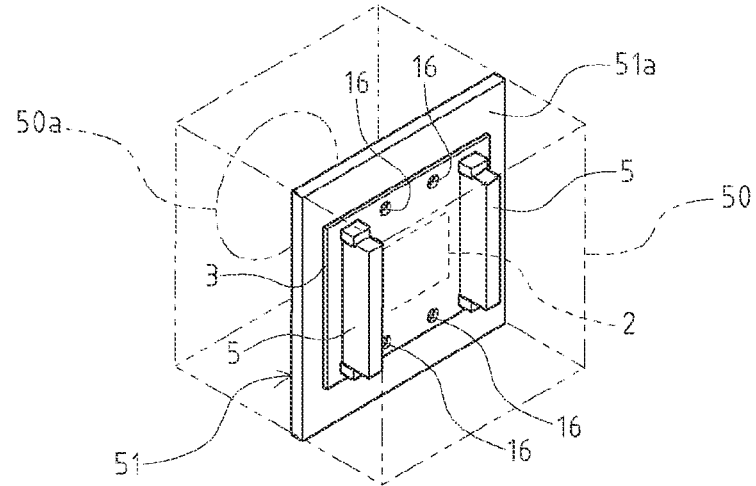

As illustrated in FIGS. 9A and 9B, in the housing 50 of the camera of the present example, a surface portion on one side (the back side in FIG. 9A) is a light-receiving side surface portion 50a that receives incident light. In the housing 50, a substrate support portion 51 is provided so as to face the light-receiving side surface portion 50a. In the housing 50, the solid-state imaging device 1 is provided on a back side surface 51a that is a surface opposite to the light-receiving side surface portion 50a with respect to the substrate support portion 51.

A screw hole 52 for receiving fixation of the solid-state imaging device 1 is formed in the substrate support portion 51. The screw holes 52 are formed at four positions corresponding to the arrangement of the holes 16 of the substrate 3. Furthermore, the substrate support portion 51 is formed with an opening 53 penetrating therethrough for allowing an arrangement region of the image sensor 2 of the solid-state imaging device 1 fixed to the back side surface 51a of the substrate support portion 51 to face the light-receiving side surface portion 50a side. The opening 53 is formed to have a size larger than that of the frame 4.

As illustrated in FIG. 9B, the solid-state imaging device 1 is positioned with respect to the substrate support portion 51 of the housing 50. The solid-state imaging device 1 is positioned such that the hole 16 of the substrate 3 coincides with the screw hole 52 in a direction in which the front surface 3a side of the substrate 3 is the light-receiving side surface portion 50a side. In the positioned state, the solid-state imaging device 1 positions the frame 4 in the opening 53 of the substrate support portion 51 and brings the front surface 3a of the substrate 3 into contact with the back side surface 51a of the substrate support portion 51.

Figure 9C:
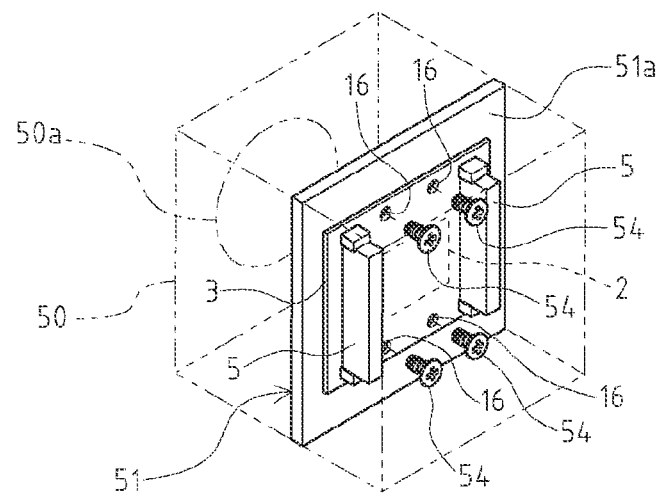

As illustrated in FIG. 9C, the solid-state imaging device 1 positioned in the housing 50 is fixed to the substrate support portion 51 by being fastened by a screw 54 as a fastener. The four holes 16 of the substrate 3 are used to fix the solid-state imaging device 1 to the substrate support portion 51. The screw 54 penetrates the hole 16 of the substrate 3, and is screwed into the screw hole 52 of the substrate support portion 51. Note that, in fixing the solid-state imaging device 1 to the substrate support portion 51, adhesion using an adhesive may be used.

Figure 10A:
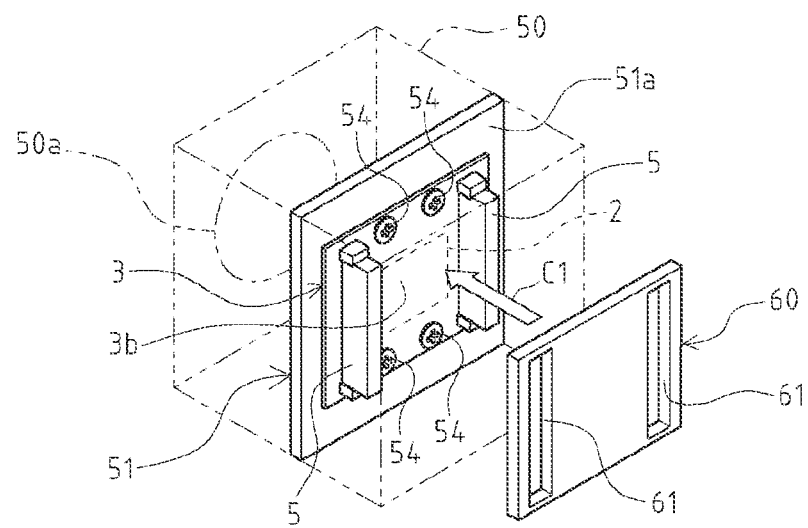
FIGS. 10A and 10B are explanatory diagrams of another example of the method of mounting the solid-state imaging device according to the first embodiment of the present technology.

As illustrated in FIG. 10A, after the solid-state imaging device 1 is fixed to the substrate support portion 51, a heat dissipation plate 60 is attached to the back surface 3b of the substrate 3 (see arrow C1). The heat dissipation plate 60 is a rectangular plate-shaped member having substantially the same size as the substrate 3, and has an opening 61 for avoiding interference with the left and right connectors 5. The opening 61 has an elongated rectangular opening shape corresponding to the plan view shape of the connector 5. The heat dissipation plate 60 brings one plate surface into contact with the back surface 3b of the substrate 3 and allows the connector 5 to pass through the opening 61. The connector 5 is in a state of causing a portion including the fitting portion 11a to protrude from the opening 61.

The heat dissipation plate 60 is bonded to the back side of the solid-state imaging device 1 by being fixed to the substrate 3 by fastening with a fastener such as a screw or adhesion with an adhesive. The heat dissipation plate 60 is made of a metal having high thermal conductivity, such as copper, brass, or aluminum.

Figure 10B:
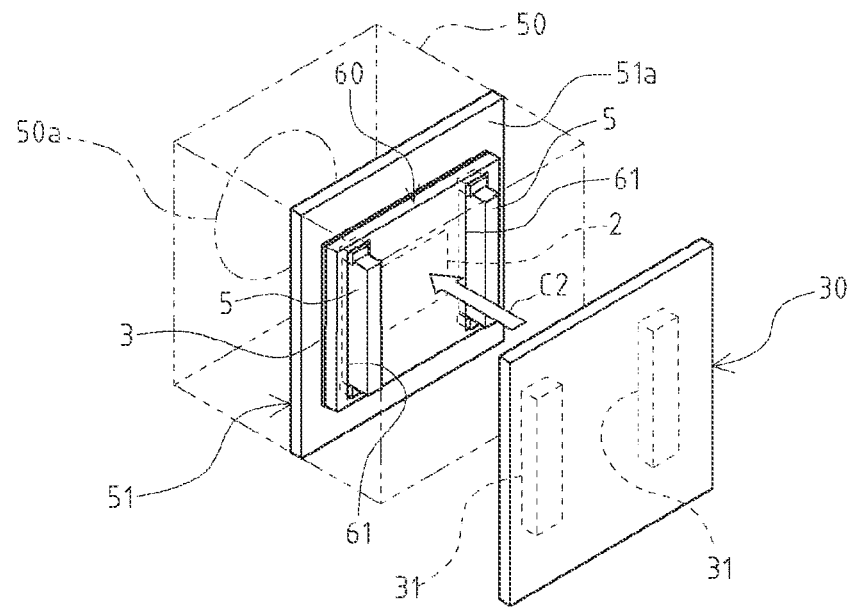

As illustrated in FIG. 10B, after the heat dissipation plate 60 is attached to the solid-state imaging device 1, the mounting substrate 30 (see FIG. 7A) is attached to the solid-state imaging device 1 (see arrow C2). That is, the connector 31 of the mounting substrate 30 is fitted to the connector 5 of the solid-state imaging device 1, and both are electrically connected to each other.

Thus, attachment of the solid-state imaging device 1 to the camera is completed. In this example, the hole 16 of the substrate 3 is used for direct attachment of the substrate 3 to the substrate support portion 51 of the housing 50 as attachment of the substrate 3 to the camera.

<4. Modification of Solid-State Imaging Device According to First Embodiment>

Figure 11A:
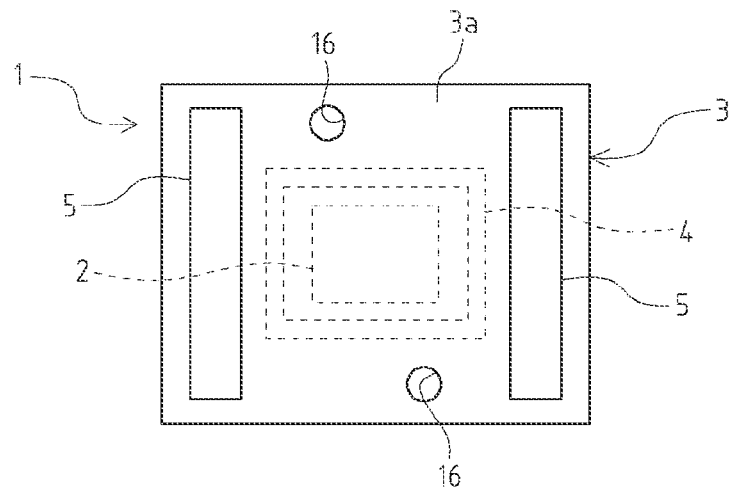
FIGS. 11A, 11B and 11C are bottom views illustrating a configuration of a modification of the solid-state imaging device according to the first embodiment of the present technology.
Figure 11B:
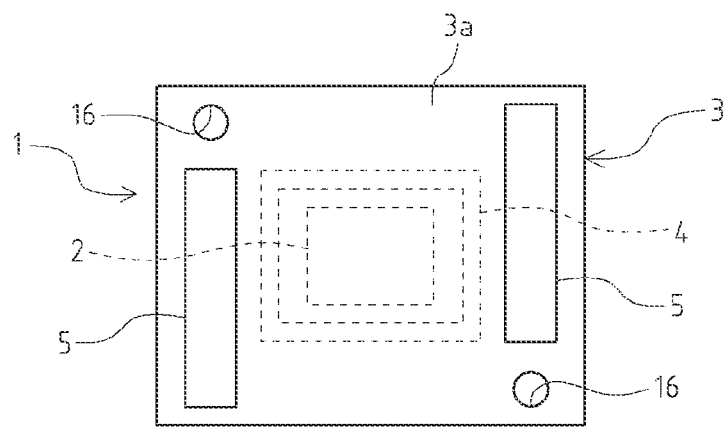
Figure 11C:
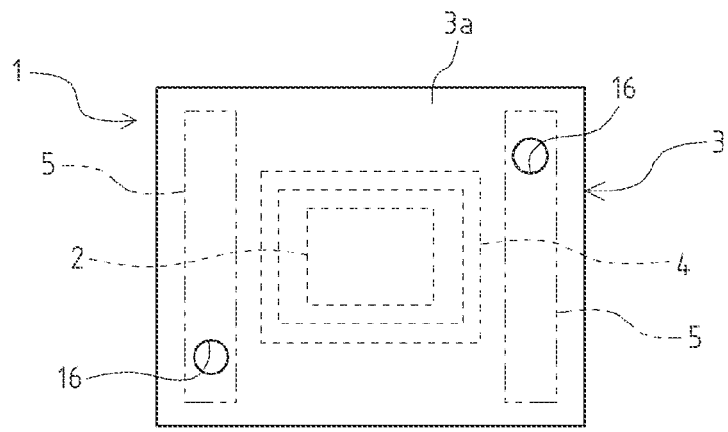

Modifications of the solid-state imaging device 1 according to the first embodiment of the present technology are illustrated in FIGS. 11A, 11B, and 11C. The following modification is a modification of the arrangement and the like of the connector 5 and the hole 16 in the solid-state imaging device 1. FIGS. 11A, 11B, and 11C are bottom views of the solid-state imaging device 1.

A first modification illustrated in FIG. 11A has a configuration in which one hole 16 is provided at each of front and rear edges of the substrate 3. For example, as illustrated in FIG. 11A, the two holes 16 are provided at point-symmetrical positions with respect to the center point of the substrate 3 in the substrate 3.

A second modification illustrated in FIG. 11B has a configuration in which one hole 16 is provided at each of two diagonal corners of the substrate 3. In this modification, the left and right connectors 5 are provided at positions shifted from the center of the substrate 3 in the front-rear direction (the vertical direction in FIG. 11B) so as not to interfere with the holes 16.

A third modification illustrated in FIG. 11C has a configuration in which holes 16 are provided in the mounting areas of the left and right connectors 5. In this modification, the hole 16 is formed in a portion avoiding an arrangement portion of a metal for soldering such as a copper foil in a mounting area of the connector 5. In the example illustrated in FIG. 11C, the two holes 16 are provided at positions near the two diagonal corners of the substrate 3 and at positions point-symmetric with respect to the center point of the substrate 3. Note that, in FIG. 11C, the connector 5 is indicated by a two-dot chain line.

According to the solid-state imaging device 1 according to the present embodiment as described above, in coping with heat generation of the solid-state imaging device 1, a package size can be reduced with a simple structure, and a transmission delay of a high-speed interface can be suppressed.

As a countermeasure for heat generation of the solid-state imaging device 1, for example, according to a configuration in which a member such as a metal plate is interposed between the image sensor 2 and the substrate 3 in order to dissipate heat, there is a problem that the package size tends to increase, and the wiring length becomes long due to the influence, and a transmission delay of a high-speed interface occurs.

On the other hand, according to the solid-state imaging device 1 according to the present embodiment, since the image sensor 2 is provided on the front surface 3a of the substrate 3 and the connector 5 is provided on the back surface 3b, the wiring length from the image sensor 2 to the connector 5 can be shortened. As a result, the package size can be easily reduced, and the transmission delay of the high-speed interface can be suppressed.

Furthermore, according to the solid-state imaging device 1 according to the present embodiment, the cavity 10 is formed under the chip of the image sensor 2 on the back surface 3b side of the substrate 3 by the arrangement configuration of the two connectors 5 with respect to the back surface 3b of the substrate 3. According to such a configuration, the heat dissipation plate 20 can be easily attached using the cavity 10 to the image sensor 2 in which heat generation increases as the number of pixels increases and the frame rate increases. As a result, heat can be efficiently released to the housing of the camera on which the solid-state imaging device 1 is mounted. As described above, according to the solid-state imaging device 1, the package structure can be downsized while the cavity 10 is secured under the chip of the image sensor 2.

Furthermore, according to the solid-state imaging device 1, since electrical connection to an external device can be performed by fitting of the connector 5, attachment and detachment to and from the mounting substrate 30, which is a substrate on the camera side, can be easily performed. In addition, it is possible to use a plurality of types of connectors 5 according to applications and usability.

Furthermore, in the manufacturing process of the solid-state imaging device 1, by performing a step of mounting the image sensor 2 on the substrate 3 after the step of mounting the connector 5 on the substrate 3, the connector 5 can be mounted in advance when the image sensor 2 is mounted. As a result, even if the image sensor 2 has relatively low solder heat resistance, the image sensor 2 can be provided without being exposed to a high-temperature environment of reflow for mounting the connector 5.

Furthermore, in the solid-state imaging device 1 according to the present embodiment, the substrate 3 includes the pressed portion 15 that receives a load for fitting the connector 5 outside the arrangement region of the frame 4. According to such a configuration, with a simple structure, the connector 5 can be fitted to the fitted portion without applying excessive stress to the package structure.

Furthermore, in the solid-state imaging device 1 according to the present embodiment, a plurality of holes 16 is formed in the peripheral edge portion of the substrate 3. According to such a configuration, alignment of the image sensor 2 and the connector 5 with respect to the substrate 3 can be performed using the hole 16, and the solid-state imaging device 1 can be attached to the camera.

Regarding the attachment of the solid-state imaging device 1 to the camera using the hole 16, since it is not necessary to separately provide an attachment portion or the like with respect to the mounting substrate 30 on the substrate 3, the attachment to the camera can be easily performed without enlarging the substrate 3. In particular, according to the configuration in which the holes 16 are provided in the mounting areas of the left and right connectors 5 as in the third modification illustrated in FIG. 6C, it is possible to eliminate the need to provide alignment marks and the need to enlarge the substrate 3 for positioning the image sensor 2 and the connector 5 with respect to the substrate 3.

<5. Configuration Example of Solid-State Imaging Device According to Second Embodiment>

A configuration example of a solid-state imaging device 1 according to a second embodiment of the present technology will be described with reference to FIGS. 12 and 13. FIGS.

12 and 13 are bottom views of a solid-state imaging device 1A. Note that, in each embodiment described below, the same reference numerals are given to the configurations common to those of the first embodiment, and the description thereof is appropriately omitted.

Figure 12:
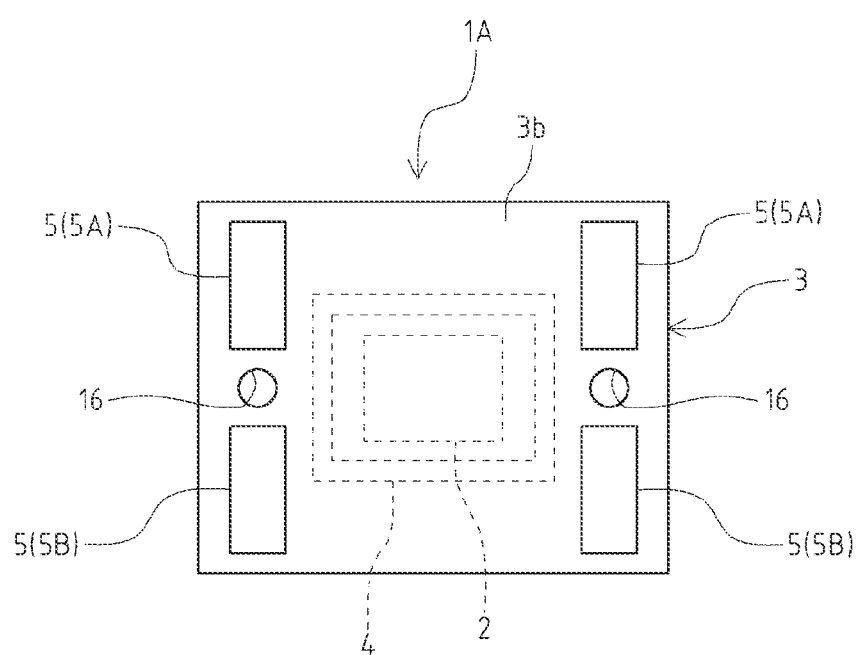
FIG. 12 is a bottom view illustrating a configuration of a solid-state imaging device according to a second embodiment of the present technology.

As illustrated in FIG. 12, in the solid-state imaging device 1A according to the present embodiment, a plurality of connectors 5 (5A, 5B) is provided at each of the edges of the substrate 3 facing each other. In the example illustrated in FIG. 12, two connectors 5A and 5B are arranged at predetermined intervals in the front-rear direction (vertical direction in FIG. 12) at the edges on both the left and right sides of the substrate 3. The two connectors 5A and 5B on the one right or left side are arranged in series with the front-rear direction as the longitudinal direction. The four connectors 5 are arranged symmetrically with respect to the left-right direction and the front-rear direction.

In the substrate 3, a hole 16 is formed at a portion between the connectors 5A and 5B adjacent to each other in the front-rear direction. That is, the holes 16 are formed at the center in the front-rear direction at both left and right ends of the substrate 3. As described above, in the solid-state imaging device 1A, the two connectors 5A and 5B are provided on each one of the right and left sides of the substrate 3, and the hole 16 is provided between the adjacent connectors 5A and 5B.

<6. Modification of Solid-State Imaging Device According to Second Embodiment>

Figure 13A:
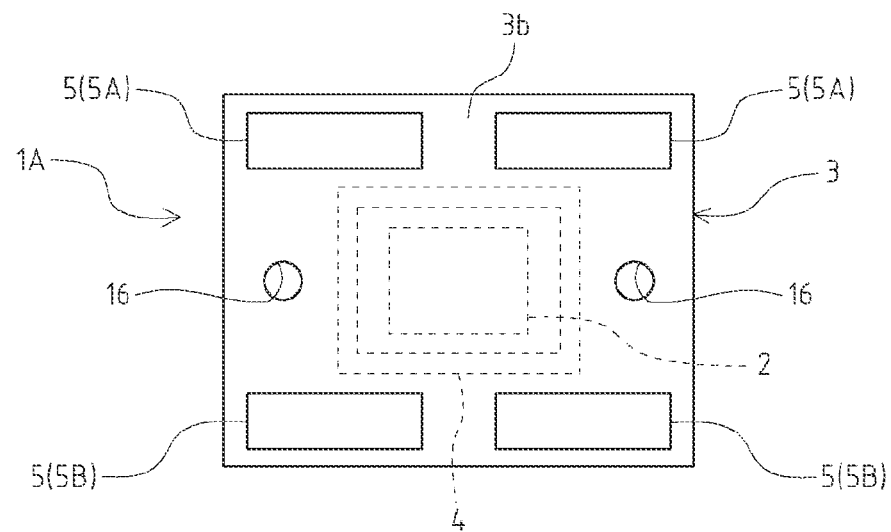
FIGS. 13A and 13B are bottom views illustrating a configuration of a modification of the solid-state imaging device according to the second embodiment of the present technology.
Figure 13B:
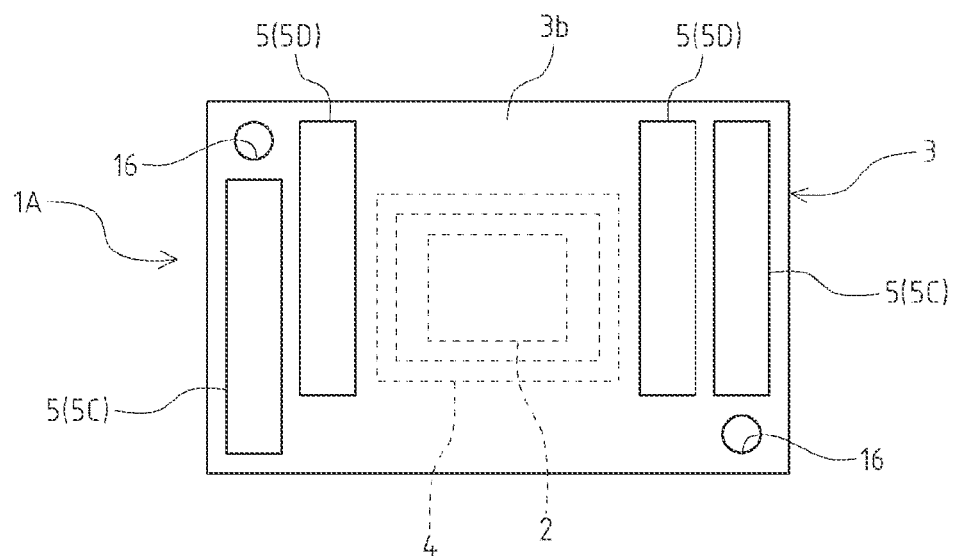

FIGS. 13A and 13B illustrate modifications of the solid-state imaging device 1A according to the second embodiment of the present technology. FIGS. 13A and 13B are bottom views of the solid-state imaging device 1A.

As illustrated in FIG. 13A, in the first modification, two connectors 5 (5A, 5B) are arranged at predetermined intervals in the left-right direction (left-right direction in FIG. 13A) at edges on both front and rear sides of the substrate 3. The two connectors 5A and 5B on the one front or rear side are arranged in series with the left-right direction as the longitudinal direction. The four connectors 5 are arranged symmetrically with respect to the left-right direction and the front-rear direction.

In the substrate 3, a hole 16 is formed in a portion near both left and right ends and between the front and rear connectors 5A and 5B facing each other in the front-rear direction. That is, the holes 16 are formed at the center in the front-rear direction at both left and right ends of the substrate 3. As described above, in the first modification, the two connectors 5A and 5B are provided on each one of the front and rear sides of the substrate 3, and the hole 16 is provided between the connectors 5A and 5B facing each other in the front and rear.

As illustrated in FIG. 13B, in the second modification, two connectors 5 (5C, 5D) are arranged at predetermined intervals in the left-right direction at edges on both left and right sides of the substrate 3. The two connectors 5C and 5D on each one of the left and right sides are arranged in parallel with the front-rear direction as the longitudinal direction. That is, the connectors 5C on the left and right outer sides and the connectors 5D on the left and right inner sides are provided in two rows.

Furthermore, as illustrated in FIG. 13B, in the second modification, two connectors B and 5C are provided on the left and right sides of the substrate 3 in mutually different arrangements. In the example illustrated in FIG. 13B, one hole 16 is formed at each of two diagonal corners of the substrate 3, and the connectors 5C on the left and right outer sides are provided at positions shifted from the center of the substrate 3 in the front-rear direction (vertical direction in FIG. 13B) so as not to interfere with the hole 16.

As described above, the connectors 5C and the two holes 16 on the left and right outer sides are provided so as to be point-symmetric with respect to the center point of the substrate 3. On the other hand, the connectors 5D on the left and right inner sides are provided symmetrically in the left-right direction.

As in the solid-state imaging device 1A according to the present embodiment as described above, a plurality of connectors 5 may be provided at each edge of the substrate 3. In the solid-state imaging device 1A, two connectors 5 are provided at each edge of the substrate 3, but three or more connectors 5 may be provided at each edge of the substrate 3.

According to the solid-state imaging device 1A according to the present embodiment, similarly to the configuration of the first embodiment, it is possible to easily align the image sensor 2 and the connector 5 and attach the image sensor 2 and the connector 5 to the camera by using the hole 16. In particular, as in the configuration of the second modification illustrated in FIG. 13B, by changing the arrangement of the connectors 5 at both ends of the substrate 3 to have asymmetric arrangement, it is possible to place a constraint on the direction of the solid-state imaging device 1A in the fitting of the connectors 5. As a result, it is possible to prevent an error (reverse insertion) in the attachment direction of the solid-state imaging device 1A with respect to the mounting substrate 30.

<7. Configuration Example of Solid-State Imaging Device According to Third Embodiment>

A configuration example of a solid-state imaging device 1B according to a third embodiment of the present technology will be described with reference to FIGS. 14 and 15. FIG. 15 is a bottom view of the solid-state imaging device 1B.

Figure 14:
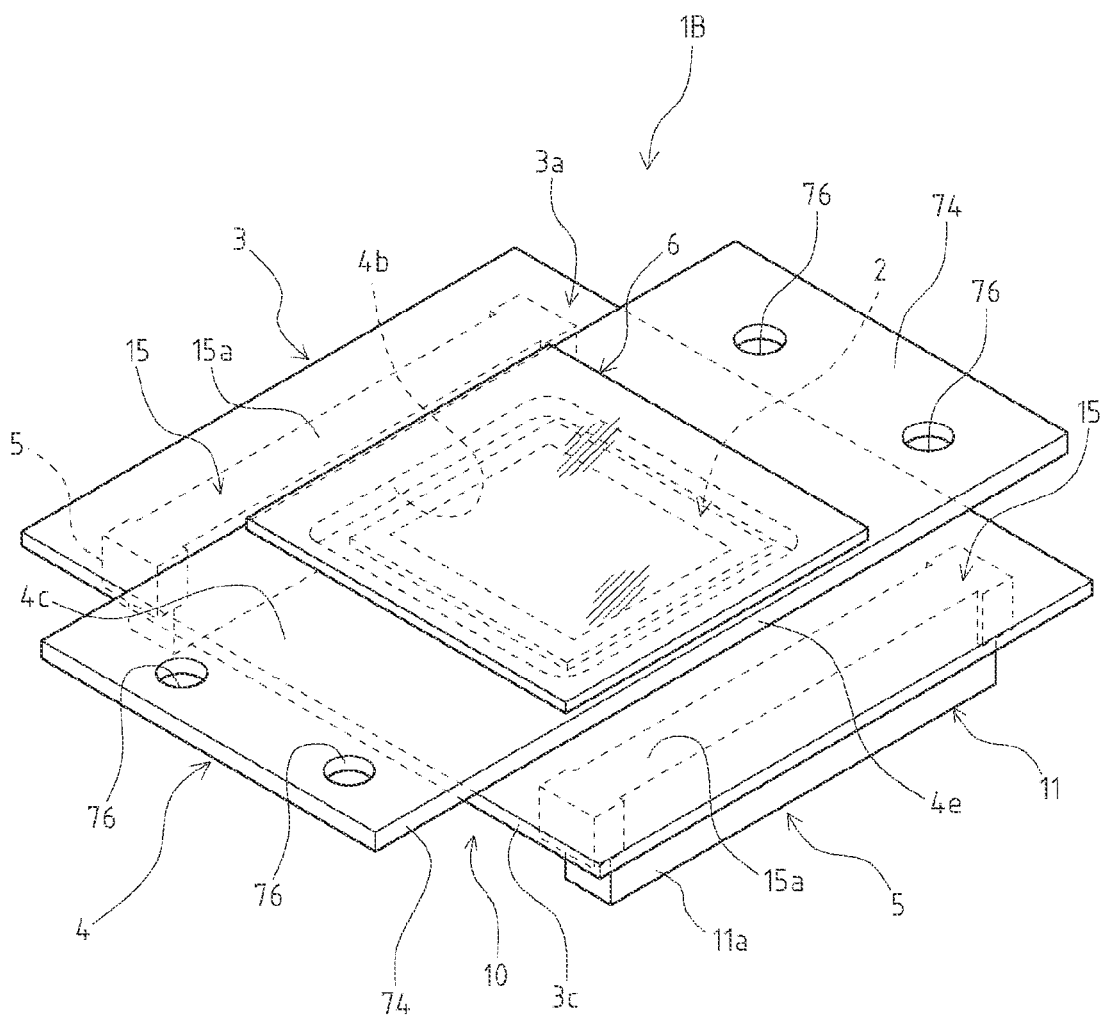
FIG. 14 is a perspective view illustrating a configuration of a solid-state imaging device according to a third embodiment of the present technology.
Figure 15:
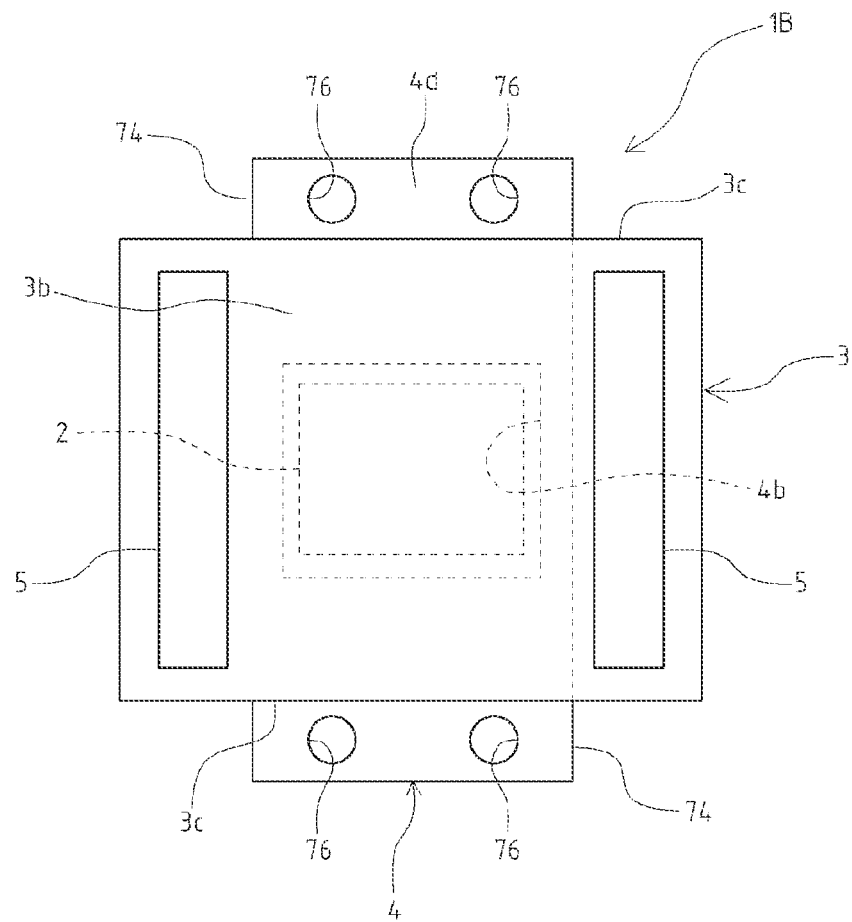
FIG. 15 is a bottom view illustrating a configuration of the solid-state imaging device according to the third embodiment of the present technology.

As illustrated in FIGS. 14 and 15, in the solid-state imaging device 1B according to the present embodiment, a hole 76 is provided in the frame 4 instead of the hole 16 of the substrate 3. That is, in the frame 4, the hole 76 penetrating in the vertical direction is formed outside the arrangement region of the image sensor 2. The hole 76 is used for at least one of alignment of a mounted component on the substrate 3 or attachment of the substrate 3 to an external device to which the solid-state imaging device 1 is attached.

In the solid-state imaging device 1B, the frame 4 has a rectangular outer shape whose longitudinal direction is the front-rear direction, and portions on both the front and rear sides are extending portions 74 protruding from the substrate 3. That is, the frame 4 has a longer dimension in the front-rear direction than the substrate 3, and the extending portions 74 on both the front and rear sides protrude from the front and rear end surfaces 3c of the substrate 3 in plan view.

The hole 76 is formed in the extending portion 74 of the frame 4. The hole 76 is a portion formed with a circular hole penetrating the extending portion 74 of the frame 4 in the plate thickness direction. In each of the front and rear extending portions 74, two holes 76 are provided at positions separated by a predetermined interval in the left-right direction.

As in the solid-state imaging device 1B according to the present embodiment as described above, the hole 76 used for alignment of mounting components and affixing to a camera may be provided in the frame 4. In the solid-state imaging device 1B, the frame 4 has the front and rear extending portions 74 as the formation portion of the hole 76, but the formation portion of the hole 76 is not particularly limited.

The formation portion of the hole 76 may be, for example, a portion extending outward from the substrate 3 in the left-right direction or the oblique direction (diagonal direction of the substrate 3) in the frame 4.

Further, the configuration in which the hole 76 is provided in the frame 4 may be used in combination with the configuration in which the hole 16 is provided in the substrate 3. That is, the hole 16, 76 may be formed in at least one of the substrate 3 or the frame 4.

According to the solid-state imaging device 1B according to the present embodiment, similarly to the configuration of the first embodiment, it is possible to easily align the image sensor 2 and the connector 5 and attach the image sensor 2 and the connector 5 to the camera by using the hole 76 of the frame 4. Furthermore, in a case where it is difficult to secure an area for forming the hole 16 in the substrate 3, the configuration of the present embodiment in which the hole 76 is provided in the frame 4 is suitably used.

<8. Configuration Example of Solid-State Imaging Device According to Fourth Embodiment>

A configuration example of a solid-state imaging device 1C according to a fourth embodiment of the present technology will be described with reference to FIGS. 16 and 17.

Figure 16:
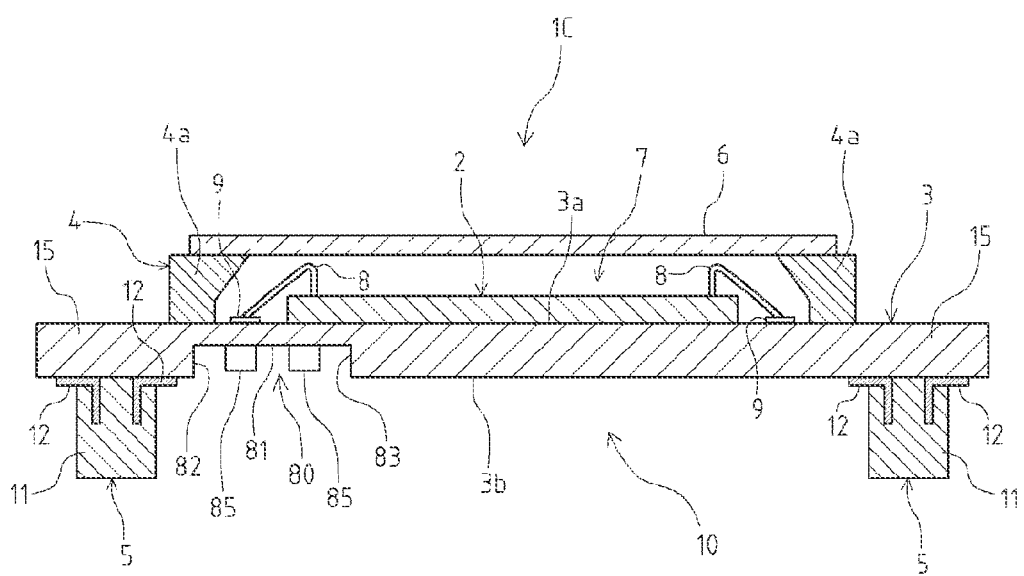
FIG. 16 is a side cross-sectional view illustrating a configuration of a solid-state imaging device according to a fourth embodiment of the present technology.

As illustrated in FIG. 16, in the solid-state imaging device 1C according to the present embodiment, a recess 80 is formed on the back surface 3b side of the substrate 3 so that at least a part thereof is positioned in the arrangement region of the image sensor 2.

The recess 80 is a portion forming a step with respect to the back surface 3b of the substrate 3, and has an upper surface 81 and left and right side surfaces 82 and 83. The recess 80 is formed to have a depth of, for example, about half to ⅔ of the thickness of the substrate 3. The recess 80 may be a groove-shaped portion in which at least one of the front or rear side is opened, or may be a hole-shaped portion having front and rear side surfaces.

In the example shown in FIG. 16, the recess 80 is formed at a portion closer to the left side with respect to the center of the substrate 3 in the left-right direction. The upper surface 81 is a surface forming a bottom surface of the recess 80, and is formed in parallel with the front surface 3a of the substrate 3. The left side surface 82, which is the left-right outer side surface of the recess 80, is positioned below the left side portion 4a of the frame 4 in the left-right direction. The right side surface 83, which is the left-right inner side surface of the recess 80, is positioned below the vicinity of the left edge of the image sensor 2 in the left-right direction.

In the substrate 3 which is a ceramic substrate, the recess 80 is formed by forming a recessed portion to be the recess 80 in the sheet member before being fired in the manufacturing process of the substrate 3. However, a method for forming the recess 80 is not particularly limited. Depending on the material or the like of the substrate 3, for example, a method of forming the recess 80 by performing drilling or the like on a plate-shaped substrate member to be the substrate 3 may be used.

Figure 17:
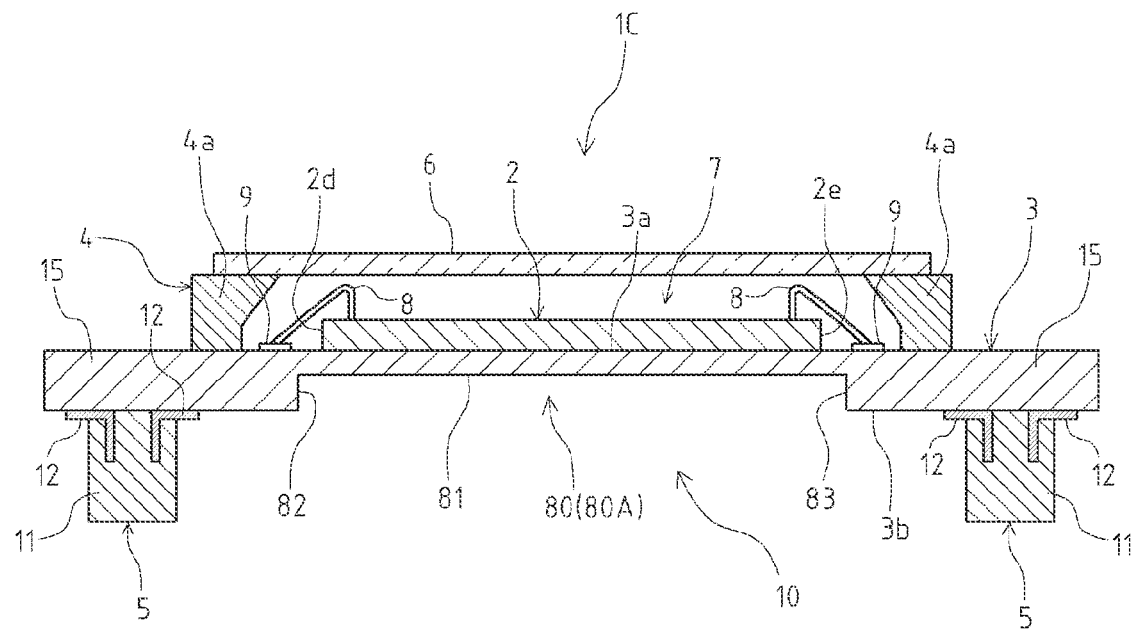
FIG. 17 is a side cross-sectional view illustrating another configuration example of the solid-state imaging device according to the fourth embodiment of the present technology.

As illustrated in FIG. 17, the recess 80 may be a recess 80A formed to include the entire arrangement region of the image sensor 2 in the front-back direction and the left-right direction. In the recess 80A, in the left-right direction, the left side surface 82 is positioned on the left side of the left end surface 2d of the image sensor 2, and the right side surface 83 is positioned on the right side of the right end surface 2e of the image sensor 2. As a result, the upper surface 81 of the recess 80A includes the entire arrangement region of the image sensor 2 in plan view.

According to the solid-state imaging device 1C according to the present embodiment, by providing the recess 80 in which a part of or the entire surface immediately below the image sensor 2 on the back surface 3b of the substrate 3 is a concave shape, it is possible to arrange the electronic components 85 such as chip components such as capacitors and resistors, electrodes, and the like, and heat dissipation components such as heat sinks in the recess 80. As a result, it is possible to mount the electronic component and the thick heat sink on the substrate 3 without enlarging the package structure.

<9. Configuration Example of Solid-State Imaging Device According to Fifth Embodiment>

A configuration example of a solid-state imaging device 1D according to a fifth embodiment of the present technology will be described with reference to FIG. 18.

Figure 18:
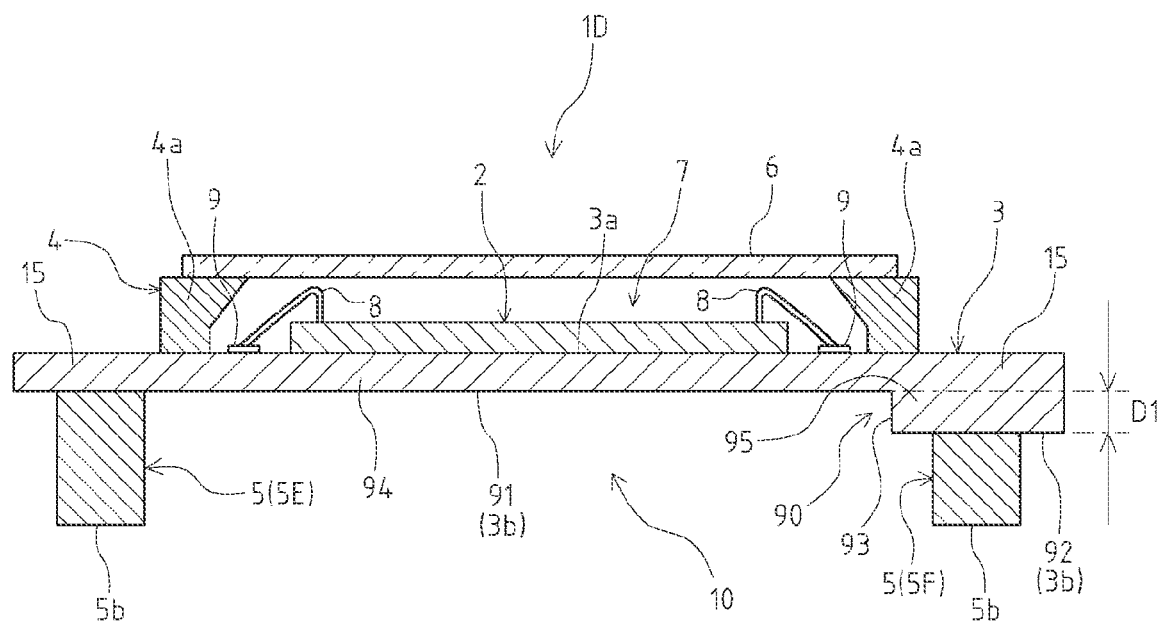
FIG. 18 is a side cross-sectional view illustrating a configuration of a solid-state imaging device according to a fifth embodiment of the present technology.

As illustrated in FIG. 18, in the solid-state imaging device 1D according to the present embodiment, a stepped portion 90 corresponding to the height of the plurality of connectors 5 is formed on the back surface 3b side of the substrate 3.

In the solid-state imaging device 1D, for example, in order to prevent reverse insertion of the solid-state imaging device 1D, there is a case where connectors 5E and 5F having different heights are mounted as the plurality of connectors 5 mounted on the back surface 3b side of the substrate 3. In such a case, the stepped portion 90 is formed such that the height position of the lower end 5b of the connector 5 becomes the common height position, that is, the lower end 5b of the connector 5 is positioned on the common horizontal plane according to the heights of the connectors 5E and 5F.

In the example illustrated in FIG. 18, the connector 5E positioned on the left side and having a relatively high height is mounted on an upper first back side surface 91 formed by the stepped portion 90 as the back surface 3b of the substrate 3. On the other hand, the connector 5F positioned on the right side and having a relatively low height is mounted on a lower second back side surface 92 formed by the stepped portion 90 as the back surface 3b of the substrate 3.

The first back side surface 91 and the second back side surface 92 are formed via a step surface 93 formed so as to follow the vertical direction in the stepped portion 90. In the present embodiment, the substrate 3 includes a thin portion 94 which is a formation portion of the first back side surface 91 and is relatively thin, and a thick portion 95 which is a formation portion of the second back side surface 92 and is relatively thick.

The thin portion 94 and the thick portion 95 of the substrate 3 are formed such that the difference D1 in height between the first back side surface 91 and the second back side surface 92 is the same as the difference in height between the connectors 5E and 5F. In the example illustrated in FIG. 18, most of the substrate 3 is the thin portion 94, and the right end is the thick portion 95 in the left-right direction. Note that the formation ranges of the first back side surface 91 and the second back side surface 92 are not particularly limited.

Regarding the stepped portion 90, for example, in a configuration in which three or more connectors 5 having different heights are mounted, the stepped portion 90 may be formed in a plurality of stages such that the height positions of the lower ends 5b of all the connectors 5 are the same according to the heights of the connectors 5. According to such a configuration, three or more stages of back side surfaces having different heights are formed as the mounting surfaces of the connectors 5 having different heights.

In the substrate 3 which is a ceramic substrate, the stepped portion 90 is formed by forming a portion of a step shape to be the stepped portion 90 in the sheet member before being fired in the manufacturing process of the substrate 3. However, a method of forming the stepped portion 90 is not particularly limited. Depending on the material or the like of the substrate 3, for example, a method of forming the stepped portion 90 by performing etching processing or the like on a plate-shaped substrate member to be the substrate 3 may be used.

According to the solid-state imaging device 1D according to the present embodiment, by providing the stepped portion 90 corresponding to the height of the connector 5 on the back surface 3b side of the substrate 3, it is possible to mount the plurality of connectors 5 having different heights. In addition, electronic components such as chip components such as capacitors and resistors, and electronic components such as electrodes, and heat dissipation components such as heat sinks can be arranged on the upper first back side surface 91 formed by the stepped portion 90. As a result, it is possible to mount the electronic component and the thick heat sink on the substrate 3 without enlarging the package structure.

<10. Configuration Example of Electronic Apparatus>

An application example of the solid-state imaging device according to the above-described embodiment to an electronic apparatus will be described with reference to FIG. 19. Note that, here, an application example of the solid-state imaging device 1 according to the first embodiment will be described.

The solid-state imaging device 1 can be applied to all electronic devices using a solid-state imaging element in an image capturing unit (photoelectric conversion unit), such as an imaging device such as a digital still camera or a video camera, a mobile terminal device having an imaging function, and a copying machine using a solid-state imaging element in an image reading unit. The solid-state imaging element may be formed as one chip, or may be in the form of a module having an imaging function in which an imaging unit and a signal processing unit or an optical system are packaged together.

Figure 19:
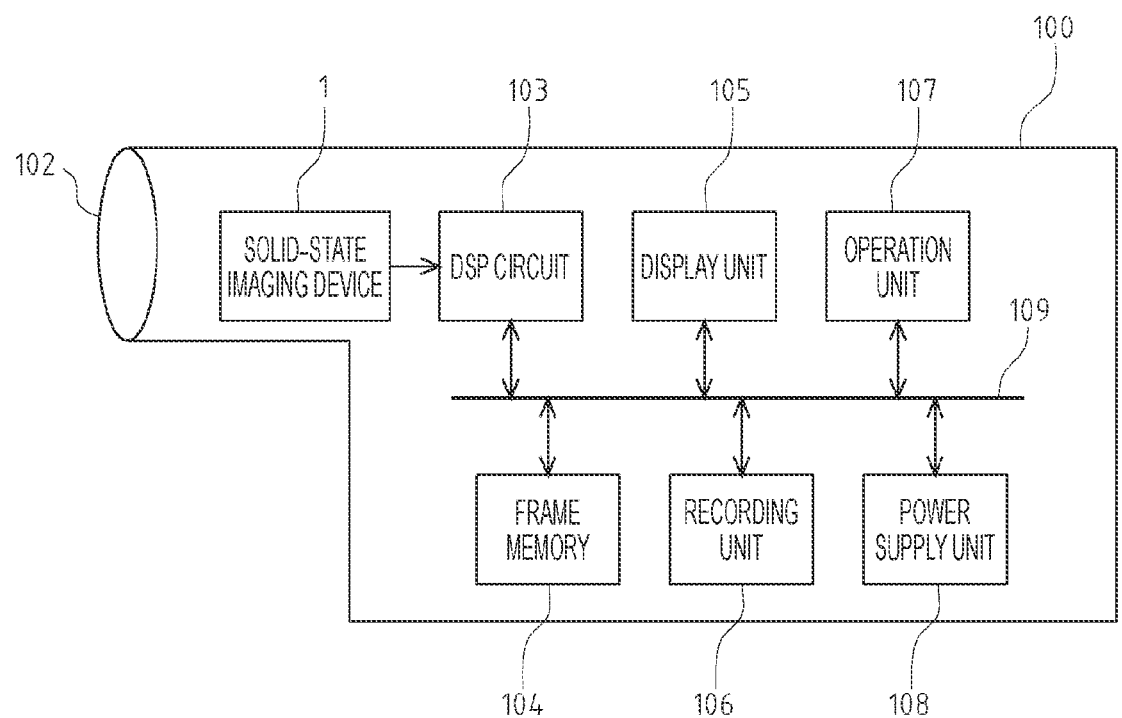
FIG. 19 is a block diagram illustrating a configuration example of an electronic apparatus including a solid-state imaging device according to an embodiment of the present technology.

As illustrated in FIG. 19, an imaging device 100 as an electronic apparatus includes an optical unit 102, a solid-state imaging device 1, a digital signal processor (DSP) circuit 103 that is a camera signal processing circuit, a frame memory 104, a display unit 105, a recording unit 106, an operation unit 107, and a power supply unit 108. The DSP circuit 103, the frame memory 104, the display unit 105, the recording unit 106, the operation unit 107, and the power supply unit 108 are connected to one another via a bus line 109.

The optical unit 102 includes a plurality of lenses and captures incident light (image light) from a subject to form an image on an imaging surface of the solid-state imaging device 1. The solid-state imaging device 1 converts a light amount of the incident light imaged on the imaging surface by the optical unit 102 into an electrical signal in units of pixels and outputs the electrical signal as a pixel signal.

The display unit 105 includes, for example, a panel type display device such as a liquid crystal panel or an organic electro luminescence (EL) panel, and displays a moving image or a still image imaged by the solid-state imaging device 1. The recording unit 106 records the moving image or the still image imaged by the solid-state imaging device 1 on a recording medium such as a hard disk or a semiconductor memory.

The operation unit 107 issues operation commands for various functions of the imaging device 100 under operation by the user. The power supply unit 108 appropriately supplies various power sources serving as operation power sources of the DSP circuit 103, the frame memory 104, the display unit 105, the recording unit 106, and the operation unit 107 to these supply targets.

According to the imaging device 100 as described above, in the solid-state imaging device 1, in coping with heat generation of the solid-state imaging device 1, a package size can be reduced with a simple structure, and a transmission delay of a high-speed interface can be suppressed. With the downsizing of the solid-state imaging device 1, the downsizing of the imaging device 100 can be promoted.

The description of the above-described embodiments is an example of the present technology, and the present technology is not limited to the above-described embodiments. For this reason, it is a matter of course that various modifications can be made according to the design and the like without departing from the technical idea according to the present disclosure even in a case other than the above-described embodiment. Furthermore, the effects described in the present disclosure are merely examples and are not limited, and other effects may be provided. In addition, the configurations of the above-described embodiments and the configurations of the modifications can be appropriately combined.

Note that, the present technology can also adopt the following configurations.

(1) A solid-state imaging device including:

a solid-state imaging element in which one plate surface side of a semiconductor substrate is a light receiving side;

a substrate on which the solid-state imaging element is mounted on a front surface that is one plate surface;

a support member provided on the front surface side of the substrate so as to surround the solid-state imaging element; and a plurality of connectors provided on a back surface that is another plate surface of the substrate and positioned outside an arrangement region of the solid-state imaging element on the substrate, in which at least a part of the connector is positioned outside an arrangement region of the support member on the substrate.

(2) The solid-state imaging device according to (1), in which the substrate includes a pressed portion that receives a load for fitting the connector to a fitted portion of the connector, outside an arrangement region of the support member on the front surface side.

(3) The solid-state imaging device according to (1) or (2), in which at at least one of the substrate or the support member, a hole penetrating in a plate thickness direction of the substrate and used for at least one of alignment of a mounted component on the substrate or attachment of the substrate to an external device is formed outside an arrangement region of the solid-state imaging element.

(4) The solid-state imaging device according to any one of (1) to (3), in which a recess is formed on the back surface side of the substrate such that at least a part of the recess is positioned in an arrangement region of the solid-state imaging element.

(5) The solid-state imaging device according to any one of (1) to (4), in which a stepped portion corresponding to a height of the plurality of connectors is formed on the back surface side of the substrate.

(6) An electronic apparatus, including a solid-state imaging device including:

a solid-state imaging element in which one plate surface side of a semiconductor substrate is a light receiving side;
a substrate on which the solid-state imaging element is mounted on a front surface that is one plate surface;
a support member provided on the front surface side of the substrate so as to surround the solid-state imaging element; and
a plurality of connectors provided on a back surface that is another plate surface of the substrate and positioned outside an arrangement region of the solid-state imaging element on the substrate,
in which at least a part of the connector is positioned outside an arrangement region of the support member on the substrate.

REFERENCE SIGNS LIST

1 Solid-state imaging device
2 Image sensor (solid-state imaging element)
3 Substrate
3a Front surface
3b Back surface
4 Frame (support member)
5 Connector
15 Pressed portion
16 Hole
74 Extending portion
76 Hole
80 Recess
90 Stepped portion
100 Imaging device

What is claimed is:

1. A solid-state imaging device, comprising:
a solid-state imaging element formed on a semiconductor substrate having a light-receiving surface;
a substrate having a front surface on which the solid-state imaging element is mounted;
a support member having a body portion and a wiring portion disposed on the front surface side of the substrate so as to surround the solid-state imaging element; and
a plurality of connectors provided on a back surface of the substrate,
wherein the plurality of connectors are located outside a region of the substrate corresponding to the solid-state imaging element in a cross-sectional view, and
wherein the body portion of the plurality of connectors is located outside a region of the substrate corresponding to the support member in the cross-sectional view.

2. The solid-state imaging device according to claim 1, wherein the substrate includes a pressed portion that receives a load for fitting the plurality of connectors to a fitted portion of the plurality of connectors, outside an arrangement region of the support member on the front surface.

3. The solid-state imaging device according to claim 1, wherein at least one of the substrate or the support member, comprises a hole penetrating in a plate thickness direction of the substrate and used for at least one of alignment of a mounted component on the substrate or attachment of the substrate to an external device is formed outside an arrangement region of the solid-state imaging element.

4. The solid-state imaging device according to claim 1, wherein a recess is formed on the back surface of the substrate such that at least a part of the recess is positioned in an arrangement region of the solid-state imaging element.

5. The solid-state imaging device according to claim 1, wherein a stepped portion corresponding to a height of the plurality of connectors is formed on the back surface of the substrate.

6. The solid-state imaging device according to claim 1, further comprising a translucent member disposed above the light-receiving surface of the semiconductor substrate.

7. The solid-state imaging device according to claim 1, wherein the solid-state imaging element is provided within a central portion of the substrate in a plan view.

8. The solid-state imaging device according to claim 1, wherein the substrate is interposed between the support member and the wiring portion in all instances.

9. The solid-state imaging device according to claim 1, wherein the wiring portion terminates at approximately a halfway portion of the body portion in the cross-sectional view.

10. The solid-state imaging device according to claim 1, wherein the main body portion of plurality of connectors has a thickness greater than a thickness of the substrate.

11. An electronic apparatus, comprising:
a solid-state imaging device comprising:
a solid-state imaging element formed on a semiconductor substrate having a light-receiving surface;
a substrate having a front surface on which the solid-state imaging element is mounted;
a support member having a body portion and a wiring portion disposed provided on the front surface side of the substrate so as to surround the solid-state imaging element; and
a plurality of connectors provided on a back surface of the substrate,
wherein the plurality of connectors are located outside a region of the substrate corresponding to the solid-state imaging element in a cross-sectional view, and
wherein the body portion of the plurality of connectors is located outside a region of the substrate corresponding to the support member in the cross-sectional view.

12. The electronic apparatus according to claim 11, wherein the substrate includes a pressed portion that receives a load for fitting the plurality of connectors to a fitted portion of the plurality of connectors, outside an arrangement region of the support member on the front surface.

13. The electronic apparatus according to claim 11, wherein at least one of the substrate or the support member, comprises a hole penetrating in a plate thickness direction of the substrate and used for at least one of alignment of a mounted component on the substrate or attachment of the substrate to an external device formed outside an arrangement region of the solid-state imaging element.

14. The electronic apparatus according to claim 11, wherein a recess is formed on the back surface of the substrate such that at least a part of the recess is positioned in an arrangement region of the solid-state imaging element.

15. The electronic apparatus according to claim 11, wherein a stepped portion corresponding to a height of the plurality of connectors is formed on the back surface of the substrate.

16. The electronic apparatus according to claim 11, further comprising a translucent member disposed above the light-receiving surface of the semiconductor substrate.

17. The electronic apparatus according to claim 11, wherein the solid-state imaging element is provided within a central portion of the substrate in a plan view.

18. The electronic apparatus according to claim 11, wherein the substrate is interposed between the support member and the wiring portion in all instances.

19. The electronic apparatus according to claim 11, wherein the wiring portion terminates at approximately a halfway portion of the body portion in the cross-sectional view.

20. The electronic apparatus according to claim 11, wherein the main body portion of plurality of connectors has a thickness greater than a thickness of the substrate.

* * * * *